US012346678B2

(12) United States Patent
Zou et al.

(10) Patent No.: US 12,346,678 B2
(45) Date of Patent: Jul. 1, 2025

(54) HYBRID COMPILATION APPARATUS AND METHOD FOR QUANTUM-CLASSICAL CODE SEQUENCES

(71) Applicant: Intel Corporation, Santa Clara, CA (US)

(72) Inventors: Xiang Zou, Portland, OR (US); Justin Hogaboam, Aloha, OR (US); Pradnya Laxman Khalate, Cornelius, OR (US); Xin-Chuan Wu, Santa Clara, CA (US); Anne Matsuura, Portland, OR (US); Shavindra Premaratne, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 639 days.

(21) Appl. No.: 17/589,647

(22) Filed: Jan. 31, 2022

(65) Prior Publication Data

US 2023/0244459 A1 Aug. 3, 2023

(51) Int. Cl.
*G06F 8/41* (2018.01)
*G06N 10/80* (2022.01)

(52) U.S. Cl.
CPC ............ *G06F 8/447* (2013.01); *G06N 10/80* (2022.01)

(58) Field of Classification Search
CPC ............................. G06F 8/447; G06N 10/80
See application file for complete search history.

(56) References Cited

U.S. PATENT DOCUMENTS

| 10,223,084 | B1 * | 3/2019 | Dunn | G06F 8/41 |
| 10,908,885 | B2 * | 2/2021 | Ducore | G06F 8/437 |
| 12,165,007 | B2 * | 12/2024 | Kim | G06N 10/80 |
| 2019/0042971 | A1 | 2/2019 | Zou | |
| 2020/0320437 | A1 * | 10/2020 | Gambetta | G06N 10/20 |

(Continued)

FOREIGN PATENT DOCUMENTS

| CN | 112926741 A | 6/2021 |
| WO | 2021/165639 A1 | 8/2021 |
| WO | 2021/195197 A1 | 9/2021 |

OTHER PUBLICATIONS

Khalate, Pradnya, et al. "An LLVM-based C++ compiler toolchain for variational hybrid quantum-classical algorithms and quantum accelerators." arXiv preprint arXiv:2202.11142 (2022).*
Lubinski, Thomas, et al. "Advancing hybrid quantum-classical computation with real-time execution." Frontiers in Physics 10 (2022).*
Ramouthar, Ravindra, and Huseyin Seker. "Hybrid Quantum-Classical Computing—A Fusion of Classical and Quantum Computational Substrates." (2023).*

(Continued)

*Primary Examiner* — Francisco J Aponte
(74) *Attorney, Agent, or Firm* — Nicholson De Vos Webster & Elliott LLP

(57) ABSTRACT

Apparatus and method for compiling and executing hybrid classical-quantum programs. For example, one embodiment of a method comprises: reading source code specifying both non-quantum operations to be performed by a host processor and quantum operations to be performed by a quantum accelerator; compiling the source code to generate a target object file, wherein portions of the source code specifying the quantum operations are compiled into quantum basic blocks (QBBs) in the target object file, each QBB comprising one or more quantum instructions to be executed by the quantum accelerator and wherein portions of the source code specifying the non-quantum operations are compiled into native instructions to be executed by the host processor.

27 Claims, 30 Drawing Sheets

(56) References Cited

U.S. PATENT DOCUMENTS

| | | | |
|---|---|---|---|
| 2021/0173660 A1 | 6/2021 | Hogaboam et al. | |
| 2021/0303282 A1* | 9/2021 | Chaplin | G06F 8/41 |
| 2022/0137989 A1* | 5/2022 | Pistoia | G06F 9/451 |
| | | | 719/320 |
| 2022/0405649 A1* | 12/2022 | Rastunkov | G06N 10/00 |
| 2023/0020389 A1* | 1/2023 | Davis | G06F 9/5038 |
| 2023/0040849 A1* | 2/2023 | Shanmugam Sakthivadivel | |
| | | | G06N 10/80 |
| 2023/0129967 A1* | 4/2023 | Oh | G06N 10/80 |
| | | | 706/62 |
| 2023/0244457 A1* | 8/2023 | Bookstein | G06F 8/447 |
| | | | 717/146 |
| 2023/0289638 A1* | 9/2023 | Peterson | G06N 10/20 |
| 2024/0177037 A1* | 5/2024 | Griffin | G06N 10/20 |
| 2024/0192938 A1* | 6/2024 | Cruz Benito | G06F 8/447 |
| 2024/0193451 A1* | 6/2024 | Matsuura | G06N 10/20 |
| 2025/0021849 A1* | 1/2025 | Daraeizadeh | G06N 10/40 |
| 2025/0036989 A1* | 1/2025 | Naveh | G06N 10/20 |

OTHER PUBLICATIONS

Da Rosa, Evandro Chagas Ribeiro, and Rafael De Santiago. "Ket quantum programming." ACM Journal on Emerging Technologies in Computing Systems (JETC) 18.1 (2021): 1-25.*

Gokhale et al., "Partial compilation of variational algorithms for noisy intermediate-scale quantum machines", Proceedings of the 52nd Annual IEEE/ACM International Symposium on Microarchitecture, Sep. 2019, 13 pages.

Kandala et al., "Hardware-efficient variational quantum eigensolver for small molecules and quantum magnets", Nature, vol. 549, No. 7671, Apr. 2017, pp. 242-246.

Preskill et al., "Quantum Computing in the NISQ era and beyond", Quantum, vol. 2 Jan. 2018, pp. 1-22.

International Search Report and Written Opinion, PCT App. No. PCT/US22/54284, Aug. 23, 2024, 10 pages.

Nemec et al., "Infinite Families of Quantum-Classical Hybrid Codes", Sep. 9, 2020, 10 pages.

International Preliminary Report on Patentability, PCT App. No. PCT/US2022/054284, Sep. 12, 2024, 07 pages.

* cited by examiner

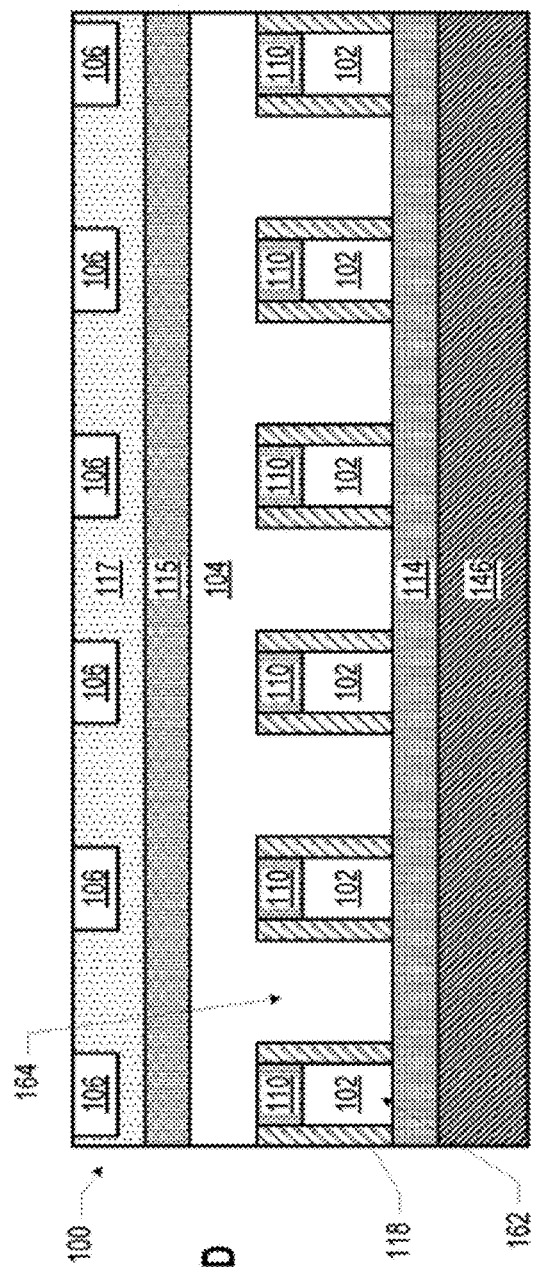
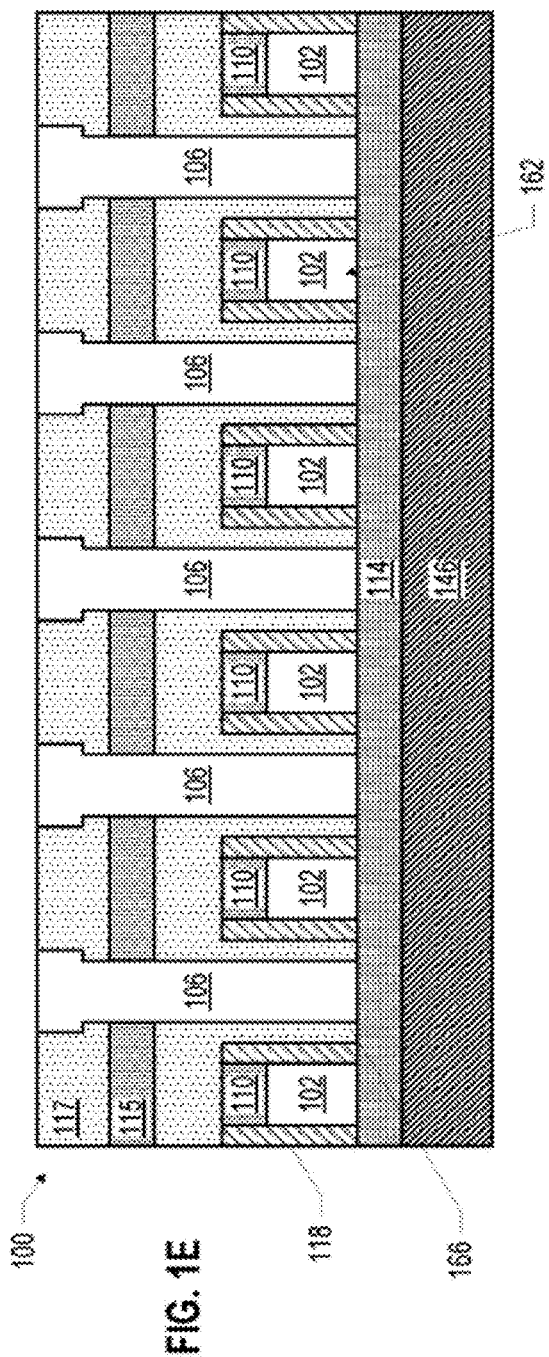

```
for k from 0 to NR-1 do
  for i from 0 to NQ-1 do
    h_x[i] ← random real number within [-1,1]   # floating point op
    h_y[i] ← random real number within [-1,1]   # floating point op
    a[i] ← 0
  end for
  for j from 0 to NP-1 do
    for i from 0 to NQ-1 do
      Initialize(q[i])
    end for
    prep params (h_x, h_y, ...)                 # quantum op, "Qu-Op Analog Signal Generator"
    for i from 0 to NT-1 do                     # floating point op
      Q(params)    # Figure 3, "Quantum circuit for many-body disordered Hamiltonian"
    end for
    for i from 0 to NQ-1 do
      a[i] ← a[i] + Measure(q[i])               # quantum op, "Qubit measurement"
    end for
  end for
  for i from 0 to NQ-1 do
    Pr[i] ← a[i] / NP;                          # floating point op
  end for
  compute system properties from Pr.            # floating point op
end for
```

*FIG. 5B*

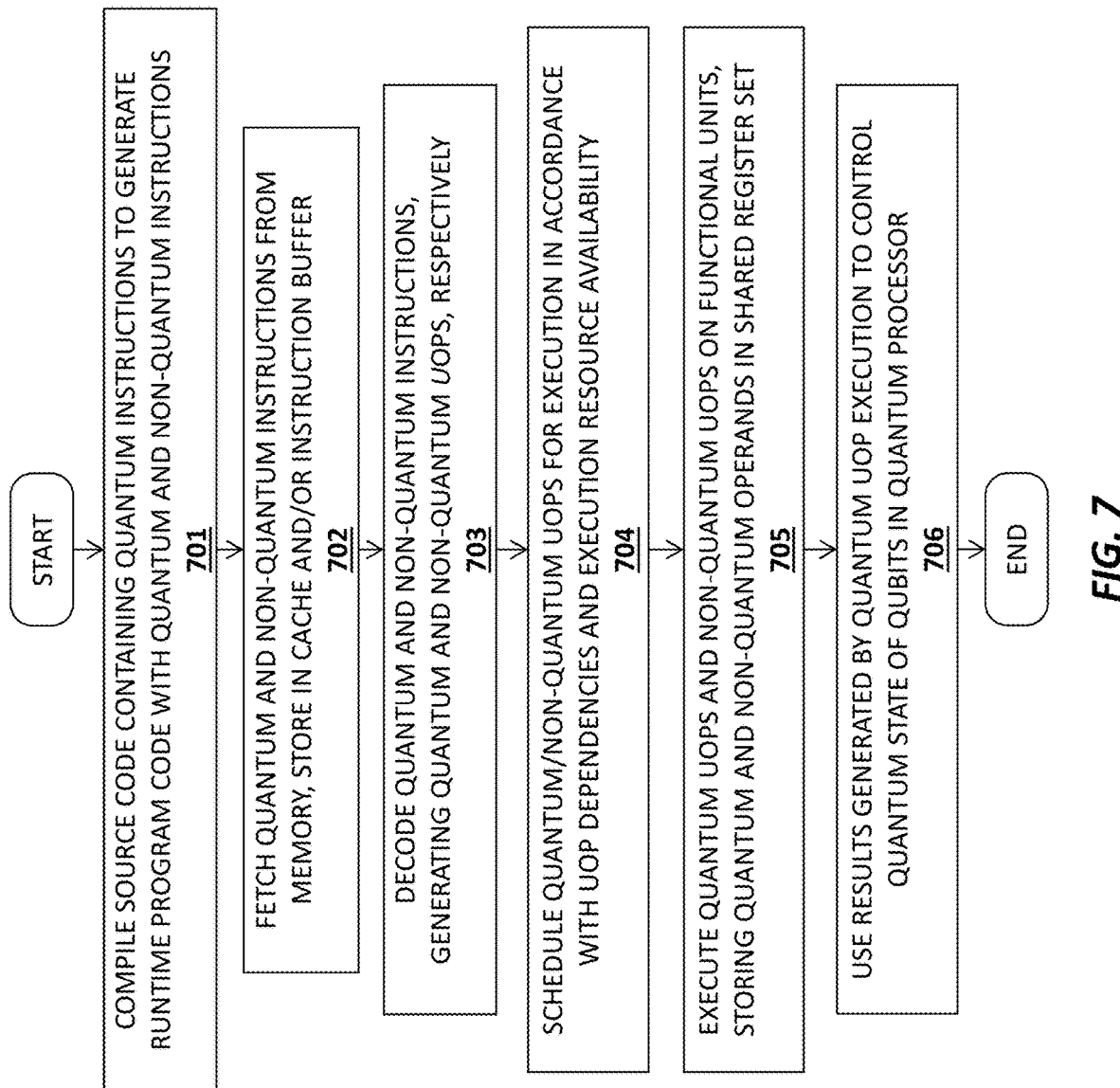

HYBRID COMPILATION APPARATUS AND METHOD FOR QUANTUM-CLASSICAL CODE SEQUENCES

BACKGROUND

Field of the Invention

The embodiments of the invention relate generally to the field of quantum computing. More particularly, these embodiments relate to an apparatus and method for hybrid compilation for quantum-classical code sequences.

Description of the Related Art

Quantum computing refers to the field of research related to computation systems that use quantum mechanical phenomena to manipulate data. These quantum mechanical phenomena, such as superposition (in which a quantum variable can simultaneously exist in multiple different states) and entanglement (in which multiple quantum variables have related states irrespective of the distance between them in space or time), do not have analogs in the world of classical computing, and thus cannot be implemented with classical computing devices.

BRIEF DESCRIPTION OF THE DRAWINGS

A better understanding of the present invention can be obtained from the following detailed description in conjunction with the following drawings, in which:

FIGS. 1A-1F illustrate various views of an example quantum dot device, in accordance with one embodiment;

FIGS. 5A-B illustrate an example quantum circuit and program code to implement the quantum circuit;

FIG. 7 illustrates a method in accordance with one embodiment of the invention;

DETAILED DESCRIPTION

Figure 1A:
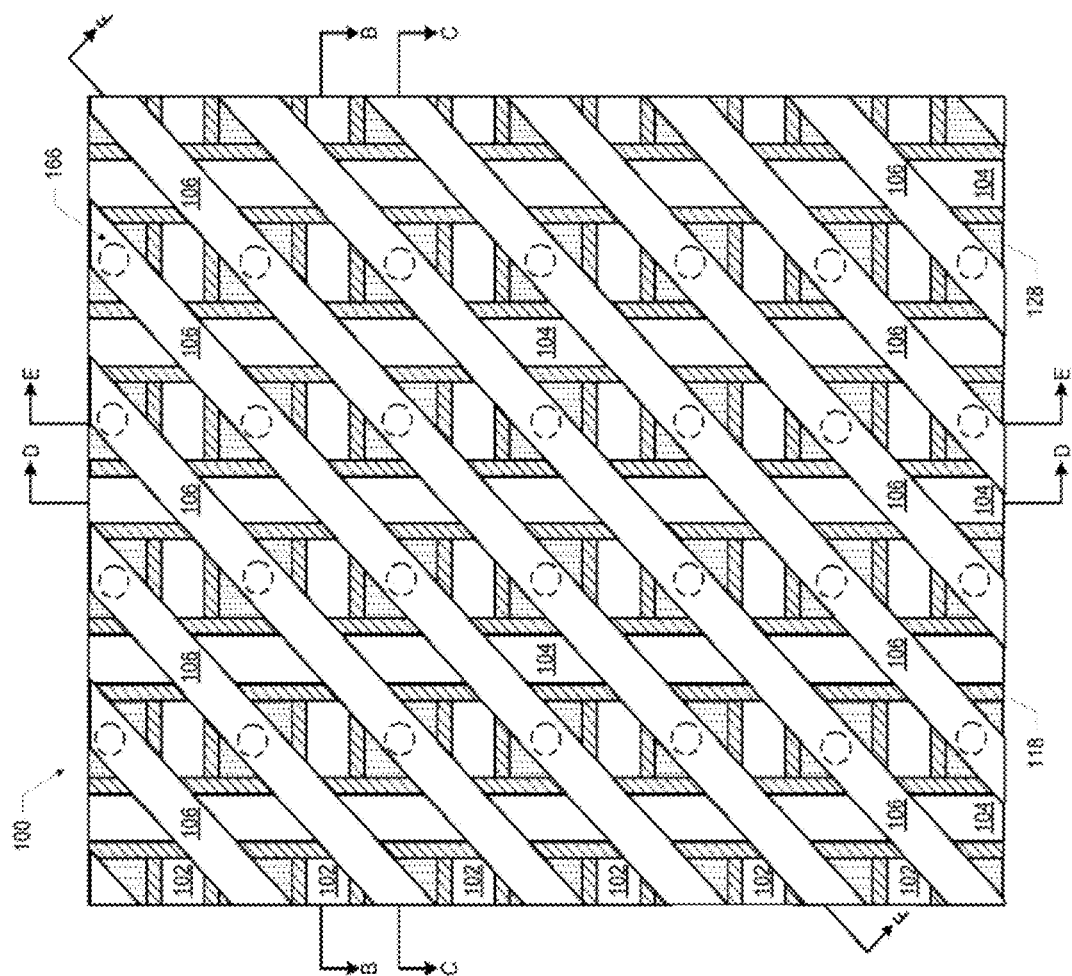

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Introduction

A quantum computer uses quantum-mechanical phenomena such as superposition and entanglement to perform computations. In contrast to digital computers which store data in one of two definite states (0 or 1), quantum computation uses quantum bits (qbits), which can be in superpositions of states. Qubits may be implemented using physically distinguishable quantum states of elementary particles such as electrons and photons. For example, the polarization of a photon may be used where the two states are vertical polarization and horizontal polarization. Similarly, the spin of an electron may have distinguishable states such as "up spin" and "down spin."

Qubit states are typically represented by the bracket notations $|0\rangle$ and $|1\rangle$. In a traditional computer system, a bit is exclusively in one state or the other, i.e., a '0' or a '1.' However, qbits in quantum mechanical systems can be in a superposition of both states at the same time, a trait that is unique and fundamental to quantum computing.

Quantum computing systems execute algorithms containing quantum logic operations performed on qubits. The sequence of operations is statically compiled into a schedule and the qubits are addressed using an indexing scheme. This algorithm is then executed a sufficiently large number of times until the confidence interval of the computed answer is above a threshold (e.g., ~95+%). Hitting the threshold means that the desired algorithmic result has been reached.

Qubits have been implemented using a variety of different technologies which are capable of manipulating and reading quantum states. These include, but are not limited to quantum dot devices (spin based and spatial based), trapped-ion devices, superconducting quantum computers, optical lattices, nuclear magnetic resonance computers, solid-state NMR Kane quantum devices, electrons-on-helium quantum computers, cavity quantum electrodynamics (CQED)

devices, molecular magnet computers, and fullerene-based ESR quantum computers, to name a few. Thus, while a quantum dot device is described below in relation to certain embodiments of the invention, the underlying principles of the invention may be employed in combination with any type of quantum computer including, but not limited to, those listed above. The particular physical implementation used for qbits is orthogonal to the embodiments of the invention described herein.

Quantum Dot Devices

Quantum dots are small semiconductor particles, typically a few nanometers in size. Because of this small size, quantum dots operate according to the rules of quantum mechanics, having optical and electronic properties which differ from macroscopic entities. Quantum dots are sometimes referred to as "artificial atoms" to connote the fact that a quantum dot is a single object with discrete, bound electronic states, as is the case with atoms or molecules.

Figure 1B:
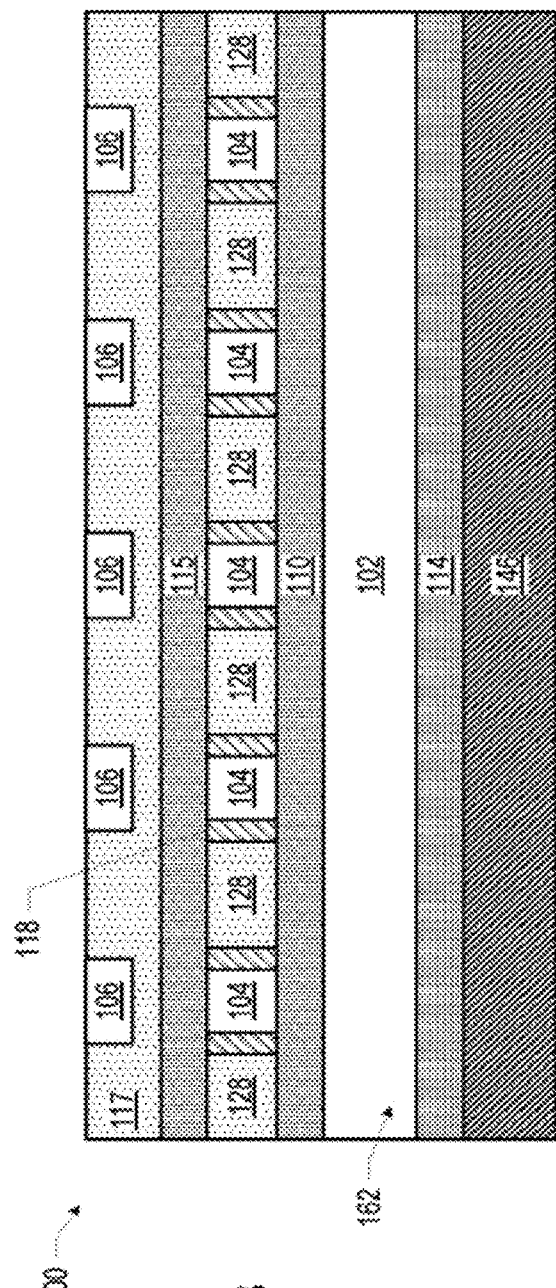
Figure 1C:
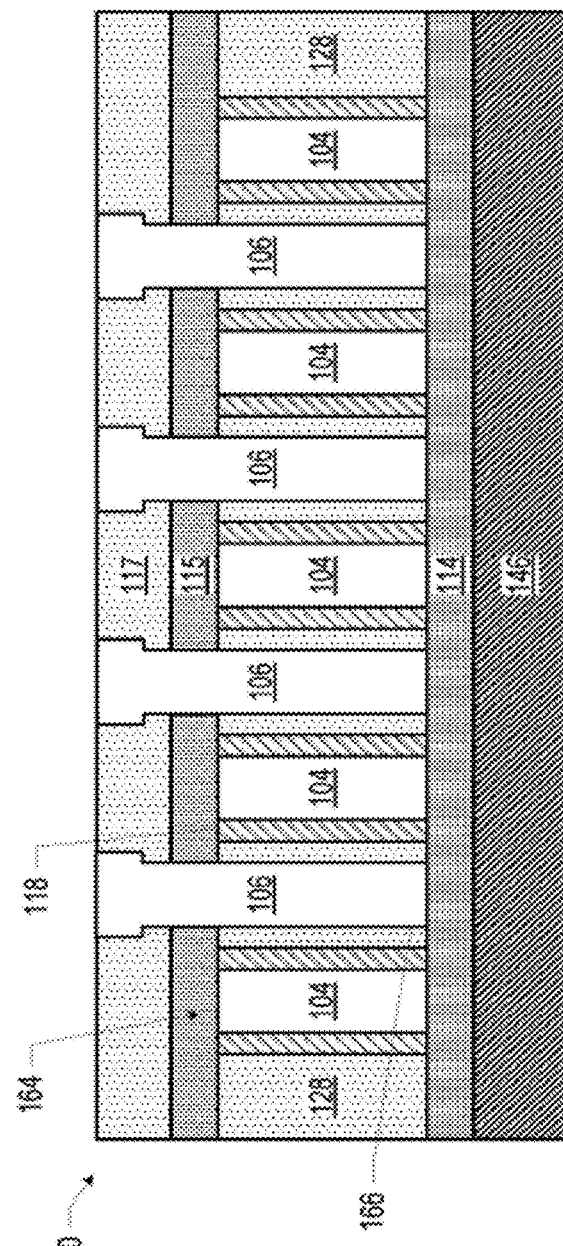
Figure 1F:
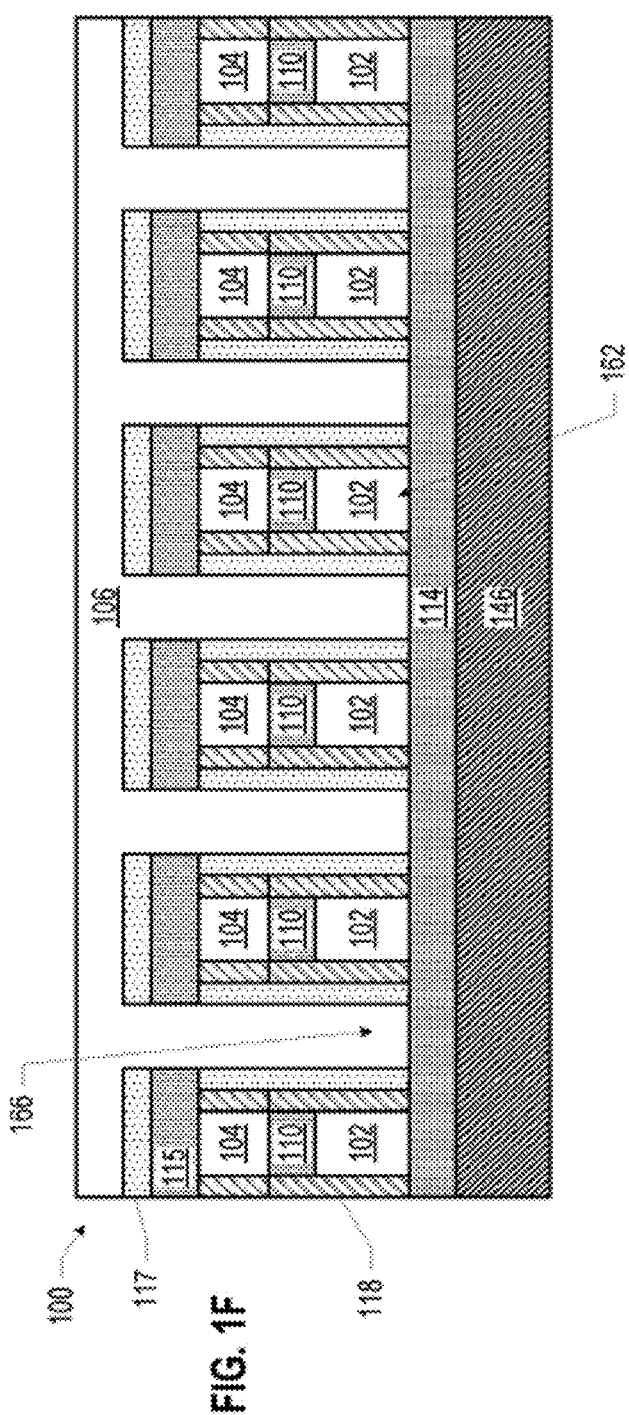

FIGS. 1A-1F are various views of a quantum dot device 100, which may be used with embodiments of the invention described below. FIG. 1A is a top view of a portion of the quantum dot device 100 with some of the materials removed so that the first gate lines 102, the second gate lines 104, and the third gate lines 106 are visible. Although many of the drawings and description herein may refer to a particular set of lines or gates as "barrier" or "quantum dot" lines or gates, respectively, this is simply for ease of discussion, and in other embodiments, the role of "barrier" and "quantum dot" lines and gates may be switched (e.g., barrier gates may instead act as quantum dot gates, and vice versa). FIGS. 1B-1F are side cross-sectional views of the quantum dot device 100 of FIG. 1A; in particular, FIG. 1B is a view through the section B-B of FIG. 1A, FIG. 1C is a view through the section C-C of FIG. 1A, FIG. 1D is a view through the section D-D of FIG. 1A, FIG. 1E is a view through the section E-E of FIG. 1A, and FIG. 1F is a view through the section F-F of FIG. 1A.

The quantum dot device 100 may be operated in any of a number of ways. For example, in some embodiments, electrical signals such as voltages, currents, radio frequency (RF), and/or microwave signals, may be provided to one or more first gate line 102, second gate line 104, and/or third gate line 106 to cause a quantum dot (e.g., an electron spin-based quantum dot or a hole spin-based quantum dot) to form in a quantum well stack 146 under a third gate 166 of a third gate line 106. Electrical signals provided to a third gate line 106 may control the electrical potential of a quantum well under the third gates 166 of that third gate line 106, while electrical signals provided to a first gate line 102 (and/or a second gate line 104) may control the potential energy barrier under the first gates 162 of that first gate line 102 (and/or the second gates 164 of that second gate line 104) between adjacent quantum wells. Quantum interactions between quantum dots in different quantum wells in the quantum well stack 146 (e.g., under different quantum dot gates) may be controlled in part by the potential energy barrier provided by the barrier potentials imposed between them (e.g., by intervening barrier gates).

Generally, the quantum dot devices 100 disclosed herein may further include a source of magnetic fields (not shown) that may be used to create an energy difference in the states of a quantum dot (e.g., the spin states of an electron spin-based quantum dot) that are normally degenerate, and the states of the quantum dots (e.g., the spin states) may be manipulated by applying electromagnetic energy to the gates lines to create quantum bits capable of computation. The source of magnetic fields may be one or more magnet lines, as discussed below. Thus, the quantum dot devices 100 disclosed herein may, through controlled application of electromagnetic energy, be able to manipulate the position, number, and quantum state (e.g., spin) of quantum dots in the quantum well stack 146.

In the quantum dot device 100, a gate dielectric 114 may be disposed on a quantum well stack 146. A quantum well stack 146 may include at least one quantum well layer 152 (not shown in FIG. 1) in which quantum dots may be localized during operation of the quantum dot device 100. The gate dielectric 114 may be any suitable material, such as a high-k material. Multiple parallel first gate lines 102 may be disposed on the gate dielectric 114, and spacer material 118 may be disposed on side faces of the first gate lines 102. In some embodiments, a patterned hardmask 110 may be disposed on the first gate lines 102 (with the pattern corresponding to the pattern of the first gate lines 102), and the spacer material 118 may extend up the sides of the hardmask 110, as shown. The first gate lines 102 may each be a first gate 162. Different ones of the first gate lines 102 may be electrically controlled in any desired combination (e.g., each first gate line 102 may be separately electrically controlled, or some or all the first gate lines 102 may be shorted together in one or more groups, as desired).

Multiple parallel second gate lines 104 may be disposed over and between the first gate lines 102. As illustrated in FIG. 1, the second gate lines 104 may be arranged perpendicular to the first gate lines 102. The second gate lines 104 may extend over the hardmask 110, and may include second gates 164 that extend down toward the quantum well stack 146 and contact the gate dielectric 114 between adjacent ones of the first gate lines 102, as illustrated in FIG. 1D. In some embodiments, the second gates 164 may fill the area between adjacent ones of the first gate lines 102/spacer material 118 structures; in other embodiments, an insulating material (not shown) may be present between the first gate lines 102/spacer material 118 structures and the proximate second gates 164. In some embodiments, spacer material 118 may be disposed on side faces of the second gate lines 104; in other embodiments, no spacer material 118 may be disposed on side faces of the second gate lines 104. In some embodiments, a hardmask 115 may be disposed above the second gate lines 104. Multiple ones of the second gates 164 of a second gate line 104 are electrically continuous (due to the shared conductive material of the second gate line 104 over the hardmask 110). Different ones of the second gate lines 104 may be electrically controlled in any desired combination (e.g., each second gate line 104 may be separately electrically controlled, or some or all the second gate lines 104 may be shorted together in one or more groups, as desired). Together, the first gate lines 102 and the second gate lines 104 may form a grid.

Multiple parallel third gate lines 106 may be disposed over and between the first gate lines 102 and the second gate lines 104. As illustrated in FIG. 1, the third gate lines 106 may be arranged diagonal to the first gate lines 102, and diagonal to the second gate lines 104. In particular, the third gate lines 106 may be arranged diagonally over the openings in the grid formed by the first gate lines 102 and the second gate lines 104. The third gate lines 106 may include third gates 166 that extend down to the gate dielectric 114 in the openings in the grid formed by the first gate lines 102 and the second gate lines 104; thus, each third gate 166 may be bordered by two different first gate lines 102 and two different second gate lines 104. In some embodiments, the third gates 166 may be bordered by insulating material 128; in other embodiments, the third gates 166 may fill the openings in the grid (e.g., contacting the spacer material 118 disposed on side faces of the adjacent first gate lines 102 and the second gate lines 104, not shown). Additional insulating material 117 may be disposed on and/or around the third gate lines 106. Multiple ones of the third gates 166 of a third gate line 106 are electrically continuous (due to the shared conductive material of the third gate line 106 over the first gate lines 102 and the second gate lines 104). Different ones of the third gate lines 106 may be electrically controlled in any desired combination (e.g., each third gate line 106 may be separately electrically controlled, or some or all the third gate lines 106 may be shorted together in one or more groups, as desired).

Although FIGS. 1A-F illustrate a particular number of first gate lines 102, second gate lines 104, and third gate lines 106, this is simply for illustrative purposes, and any number of first gate lines 102, second gate lines 104, and third gate lines 106 may be included in a quantum dot device 100. Other examples of arrangements of first gate lines 102, second gate lines 104, and third gate lines 106 are possible. Electrical interconnects (e.g., vias and conductive lines) may contact the first gate lines 102, second gate lines 104, and third gate lines 106 in any desired manner.

Not illustrated in FIG. 1 are accumulation regions that may be electrically coupled to the quantum well layer of the quantum well stack 146 (e.g., laterally proximate to the quantum well layer). The accumulation regions may be spaced apart from the gate lines by a thin layer of an intervening dielectric material. The accumulation regions may be regions in which carriers accumulate (e.g., due to doping, or due to the presence of large electrodes that pull carriers into the quantum well layer), and may serve as reservoirs of carriers that can be selectively drawn into the areas of the quantum well layer under the third gates 166 (e.g., by controlling the voltages on the quantum dot gates, the first gates 162, and the second gates 164) to form carrier-based quantum dots (e.g., electron or hole quantum dots, including a single charge carrier, multiple charge carriers, or no charge carriers). In other embodiments, a quantum dot device 100 may not include lateral accumulation regions, but may instead include doped layers within the quantum well stack 146. These doped layers may provide the carriers to the quantum well layer. Any combination of accumulation regions (e.g., doped or non-doped) or doped layers in a quantum well stack 146 may be used in any of the embodiments of the quantum dot devices 100 disclosed herein.

Apparatus and Method for a Hybrid Classical Quantum Computer

After Richard Feynman asked in 1982 whether quantum physics could be simulated efficiently using a quantum computer, much effort researching for a quantum computer has been focused on its universality and its efficiency over classical computation. One such example is David Deutsch's quantum Turing machine in 1985 that can be programmed to perform any computational task that can be performed by any physical object.

In contrast to theories and algorithms, quantum physical machines are in still their infancy. Efforts to build quantum information processing systems have resulted in modest success to date. Small quantum computers, capable of performing a small set of quantum operations on a very few qubits, represent the state of the art in quantum computation.

In addition, quantum states are fragile in the sense that quantum states only remain coherent for a limited duration. This gap between algorithms and physical machines has driven the effort to invent hybrid classical-quantum algorithms. Some recent quantum algorithm developments have focused on short-depth quantum circuits to carry out quantum computations formed as subroutines embedded in a larger classical optimization loop, such as the variational eigensolver (P. J. J. O'Malley, 2016). Quantum languages, tools, and flows have been developed, providing software layers/stacks to translate and optimize applications to the quantum physical layer to cope with the stringent resource constraints in quantum computing (Frederic T. Chong, 2017, 14 Sep.).

On the hardware side, classical computers have been used to perform error correction for quantum computations. The "quantum co-processor" model is the most favorable prevailing execution model where a classical CPU controls a quantum processing unit in a similar manner to how CPUs in modern computer systems interact with GPUs. As described in (X. Fu, 2016, May) and (X. Fu, 2018), the microarchitecture for experimental superconducting quantum co-processors included features such as an arbiter on the code fetch data path to steer classical instruction to host CPU and quantum instruction to quantum co-processor, an exchange register file to synchronize register files between host CPU and the quantum co-processor, and a quantum instruction cache.

The microarchitectures for these mechanisms, however, are not well defined and explicit support for hybrid classical-quantum programs is lacking. Consequently, it is unclear how a quantum co-processor would be implemented within a quantum computer, particularly one which is required to run a diverse set of quantum programs. A flexible and programmable model has yet to be developed for executing hybrid classical-quantum algorithms.

One embodiment of the invention adds a set of quantum instructions to an instruction set architecture (ISA) of a processor such as a CPU. By way of example, these instructions may be included in an extension to the ISA (e.g., such as the AVX-512 extensions for the x86 platform). In addition, in one embodiment, a quantum engine is added to the processor's execution unit and the new quantum instructions are fetched, decoded, scheduled, and executed on the functional units of the quantum engine. In one embodiment, the quantum engine interacts with the classical execution engines using a shared register file and/or system memory. Upon executing the quantum instructions (or quantum uops in certain embodiments described herein), the quantum execution engine generates control signals to manipulate the state of the qubits within the quantum processor. The quantum engine also executes instructions to take a measurement of specified sets of qubits and store the results. In these embodiments, a quantum/classical interface provides connectivity between the quantum engine of the classical processor and the quantum processor.

Figure 2:
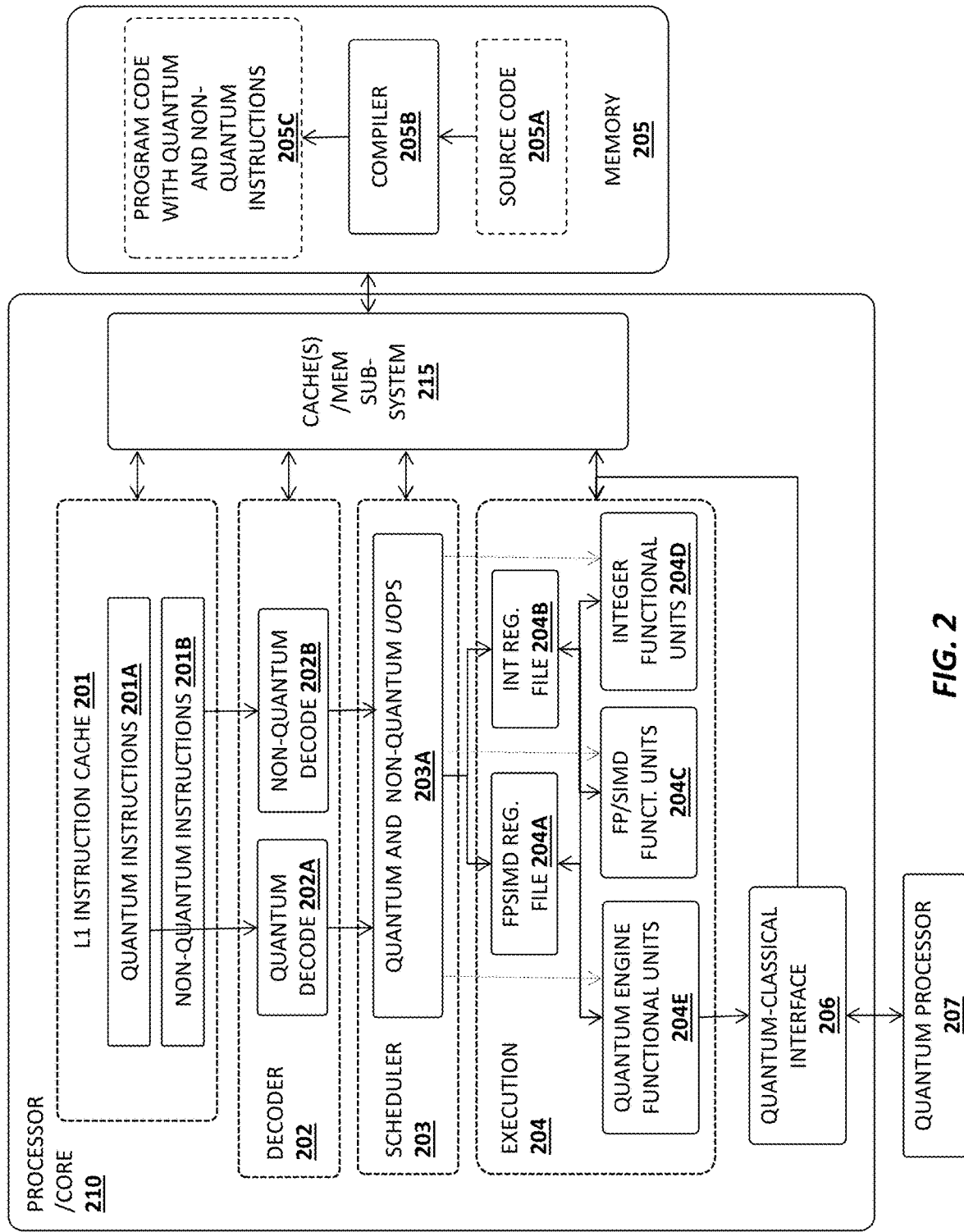
FIG. 2 illustrates one embodiment of a processor pipeline for processing quantum and non-quantum instructions.

FIG. 2 illustrates one embodiment of a processor or core 210 which fetches, decodes, and executes quantum instructions 201A and non-quantum instructions 201B, utilizing the same pipeline resources as the non-quantum instructions 201B. The processor/core 210 of this embodiment supports quantum extensions to an existing ISA of the processor/core 210 (e.g., extending the ISA to include the quantum instructions 201A). Program code 205C comprising the quantum and non-quantum instructions is generated by a compiler 205B from source code 205A written by a programmer (e.g., utilizing the extended ISA). Various source/program code examples are provided below.

Quantum and non-quantum instructions 201A-B are fetched from memory 205 at the front end of the instruction pipeline and stored in a Level 1 (L1) instruction cache 201. Instructions and data may also be stored within a Level 2 or Level 3 cache within a cache/memory subsystem 215, which manages memory requests and cache coherency.

A decoder 202 decodes the instructions 201A-B into micro-operations or uops 203A which are scheduled for execution by a scheduler 203 and executed by execution circuitry 204. In one embodiment, certain stages of the pipeline are enhanced to include hardware support for processing the quantum instructions 201B while other stages are unaltered. For example, quantum decode circuitry 202A may be added to the decoder 202 for decoding the quantum instructions 201A, just as non-quantum decode circuitry 202B decodes non-quantum instructions 201B. Although illustrated as separate components in FIG. 2 for the purpose of explanation, the quantum decode circuitry 202A and non-quantum decode circuitry 202B may comprise a common or overlapping set of circuitry and/or microcode. For example, in one embodiment, an existing decoder may be extended to include microcode support for quantum instructions (e.g., in microcode ROM) to generate new sets of quantum uops. The decoder 202 includes other decode circuitry such as a set of decode table structures (see, e.g., FIG. 3 and associated text), depending on the processor architecture.

In one embodiment, the decoder 202 generates a sequence of uops 203A in response to decoding the instructions 201A-B. In an implementation with quantum and non-quantum instructions, the uops may include a mixture of quantum uops and non-quantum uops, which are then scheduled for execution by an instruction scheduler 203.

The quantum and non-quantum uops 203A generated by the decoder 202 may initially be queued for execution within one or more uop queues of the scheduler 203, which dispatches the uops from the uop queue(s) in accordance with dependencies and/or execution resource availability. The embodiments of the invention may be implemented on various different types of processors with different types of schedulers. For example, in one embodiment, a set of execution "ports" couple the scheduler 203 to the execution circuitry 204, where each execution port is capable of issuing uops to a particular set of functional units 204C-E. In the example architecture shown in FIG. 2, for example, SIMD and floating point (FP) uops may be issued by the scheduler 203 over a FP/SIMD execution port coupled to a set of FP/SIMD functional units 204C and integer uops may be issued over an integer port coupled to a set of integer functional units 204D. While only two types of non-quantum functional units are shown for simplicity, the processor/core 210 may include various other/additional non-quantum functional units (e.g., such as load/store address generation units, branch units, additional SIMD and integer units, etc).

In the particular embodiment shown in FIG. 2, the quantum engine functional units 204E share the same set of register files 204A-B used by the legacy processor functional units 204C-D. In this particular example, the register files 204A-B include a FP/SIMD register file 204A which stores floating point and SIMD operands used by the FP/SIMD functional units 204C and an integer register file 204B which stores integer operands for the integer functional units 204D. In one implementation, the FP/SIMD register file 204A comprises 512 bit vector registers and the integer register file 204B comprises 64-bit scalar registers.

Of course, different processor architectures will use different types of registers shared by the quantum engine functional units 204E. Various other types of registers may also be used such as a set of control/status registers and mask registers.

In an embodiment in which quantum uops are mixed with non-quantum uops, the quantum uops are issued over one or more quantum ports to a set of quantum engine functional units 204E, which execute the quantum uops to perform the underlying quantum operations. For example, the quantum engine functional units 204E, in response to the quantum uops, may generate control signals over a quantum-classical interface 206 to manipulate and take measurements of the qubits of a quantum processor 207.

The quantum-classical interface 206 includes digital-to-analog (D-A) circuitry to convert the digital quantum control signals generated by the quantum engine functional units 204E to analog signals required to control the quantum processor 207 (e.g., such as the codeword triggered pulse generation (CTPG) units and Arbitrary Waveform Generator (AWG) described below) and also includes analog-to-digital (A-D) circuitry to convert the physical qubit measurements to digital result data.

In one embodiment, the quantum-classical interface 206 is integrated on the same semiconductor chip as the other components of the instruction processing pipeline (e.g., the execution circuitry 204, scheduler 203, decoder 202, etc). As discussed in detail below, different types of circuit/logic components may be used depending on the particular physical implementation of the quantum processor 207.

Figure 3:
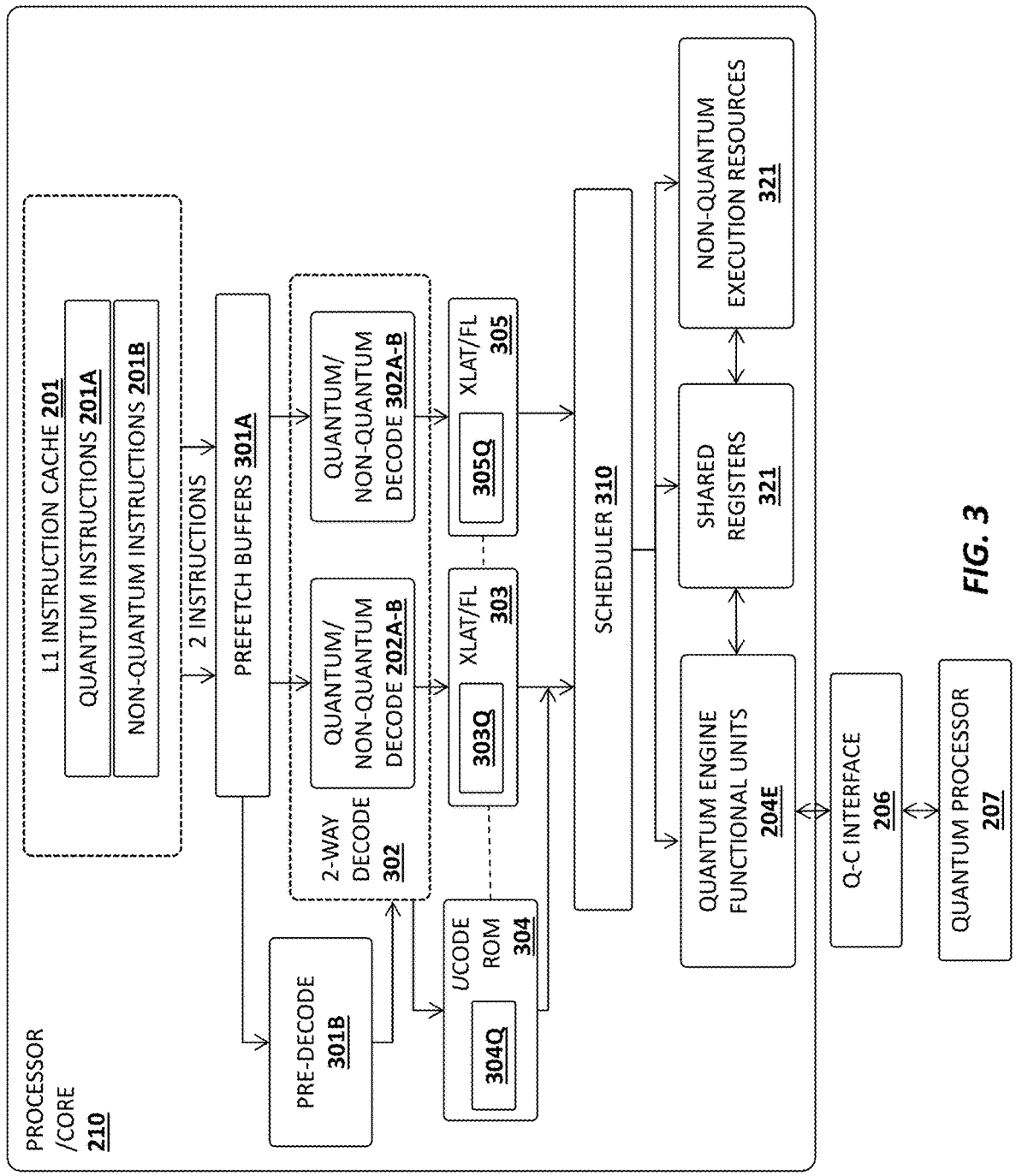
FIG. 3 illustrates an embodiment of front-end circuitry of a processor for processing quantum and non-quantum instructions.

FIG. 3 illustrates one embodiment in which quantum instruction processing support is added to a low power processing pipeline including a pre-decode buffer 301B, a 2-way decoder 302 with dual sets of quantum/non-quantum decoder circuitry 202A-B, 302A-B, dual lookup tables for instruction translation (XLAT), and a ucode ROM 304. In one embodiment, the XLAT components 303, 305 and ucode ROM 304 are extended to support the quantum instructions, as indicated by logic blocks 303Q-305Q. The pre-decode buffer 301B detects and marks macroinstruction boundaries prior to full decoding into uops by the 2-way decoder 302.

The operands for the quantum and non-quantum uops are stored in a set of shared registers 321 (as described above) and accessed by the quantum functional units 320 when executing the uops. The Q-C interface 320, in response to the quantum uops, controls the operation of the quantum processor 207.

Figure 4A:
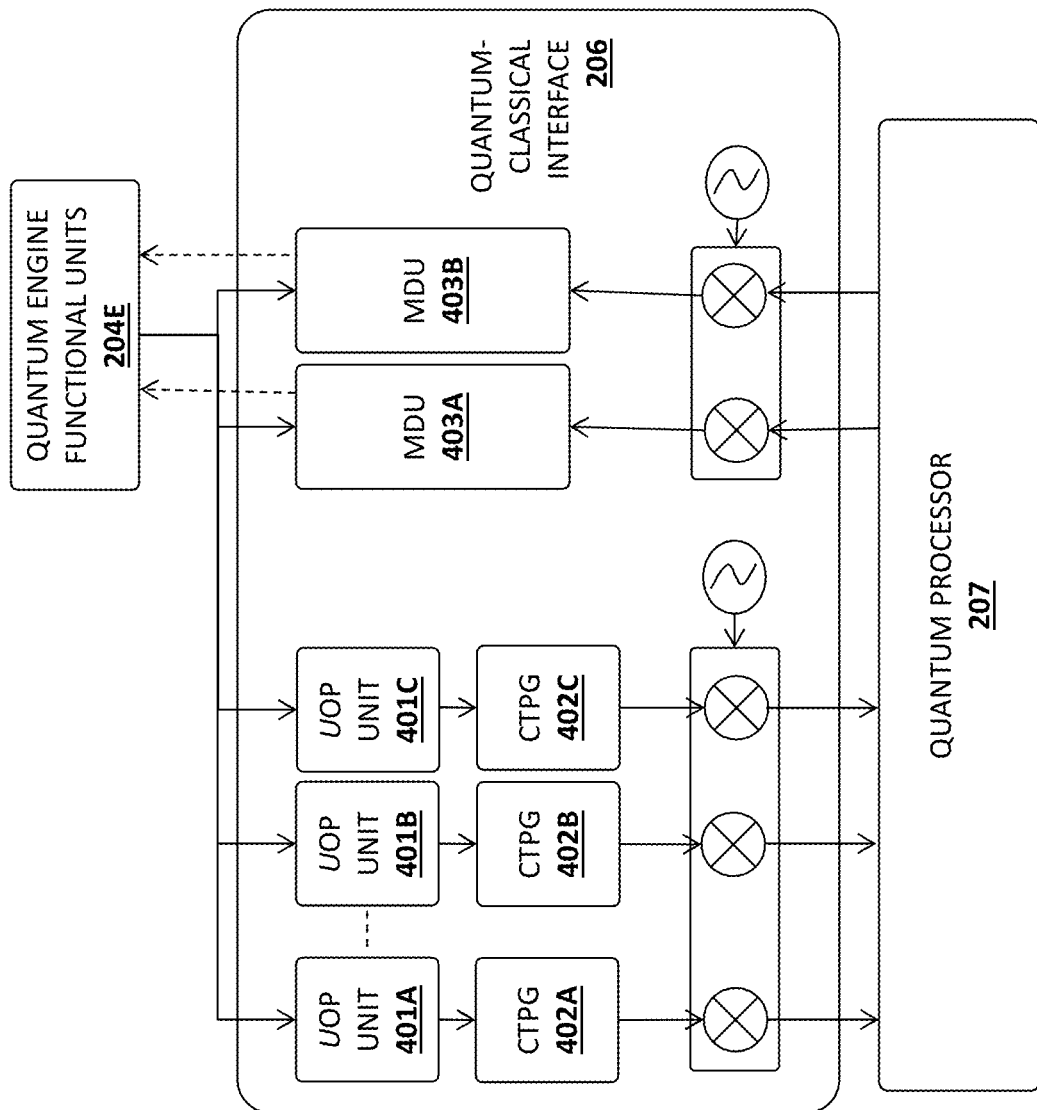
FIGS. 4A-B illustrate embodiments of a quantum-classical processor interface.
Figure 4B:
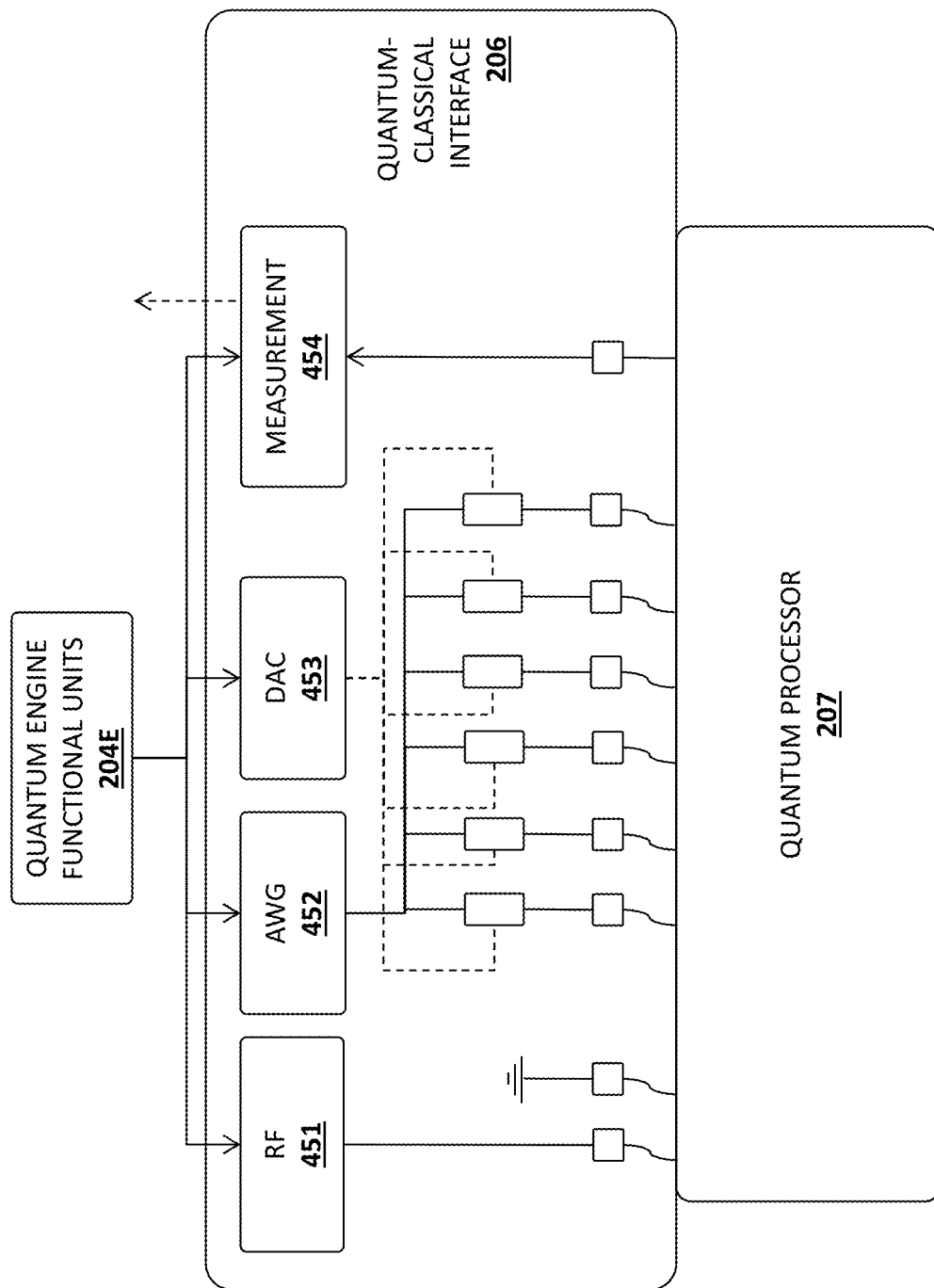

Different examples of a quantum-classical interface 206 are illustrated in FIGS. 4A-B. The Q-C interface 206 in FIG. 4A includes a plurality of uop units 401A-C which, responsive to the uops executed by the quantum engine functional units 204E, generate codewords to control operation of a plurality of codeword triggered pulse generation (CTPG) units 402A-C. In response, the CTPG units 402A-C generate sequences of pulses to control the qubits of the quantum processor 207. Once the quantum processor 207 has reached a specified execution state, quantum measurements are taken by one or more of the measurement discrimination units (MDUs) 403A-B.

The Q-C interface 206 shown in FIG. 4B includes a set of components to perform microwave complex signal generation including an RF microwave unit 451, multi-channel Arbitrary Waveform Generators (AWG) 452, one or more digital to analog converters (DACs) 453 and one or more measurement units 454. In one embodiment, the input to each of these components comprises a set of codewords generated by the quantum engine functional units 204E and the output is an analog waveform which manipulates the state of the qubits of the quantum processor 207. The measurement units 454 measure a current state associated with one or more qubits at a designated point in execution.

Figure 5A:
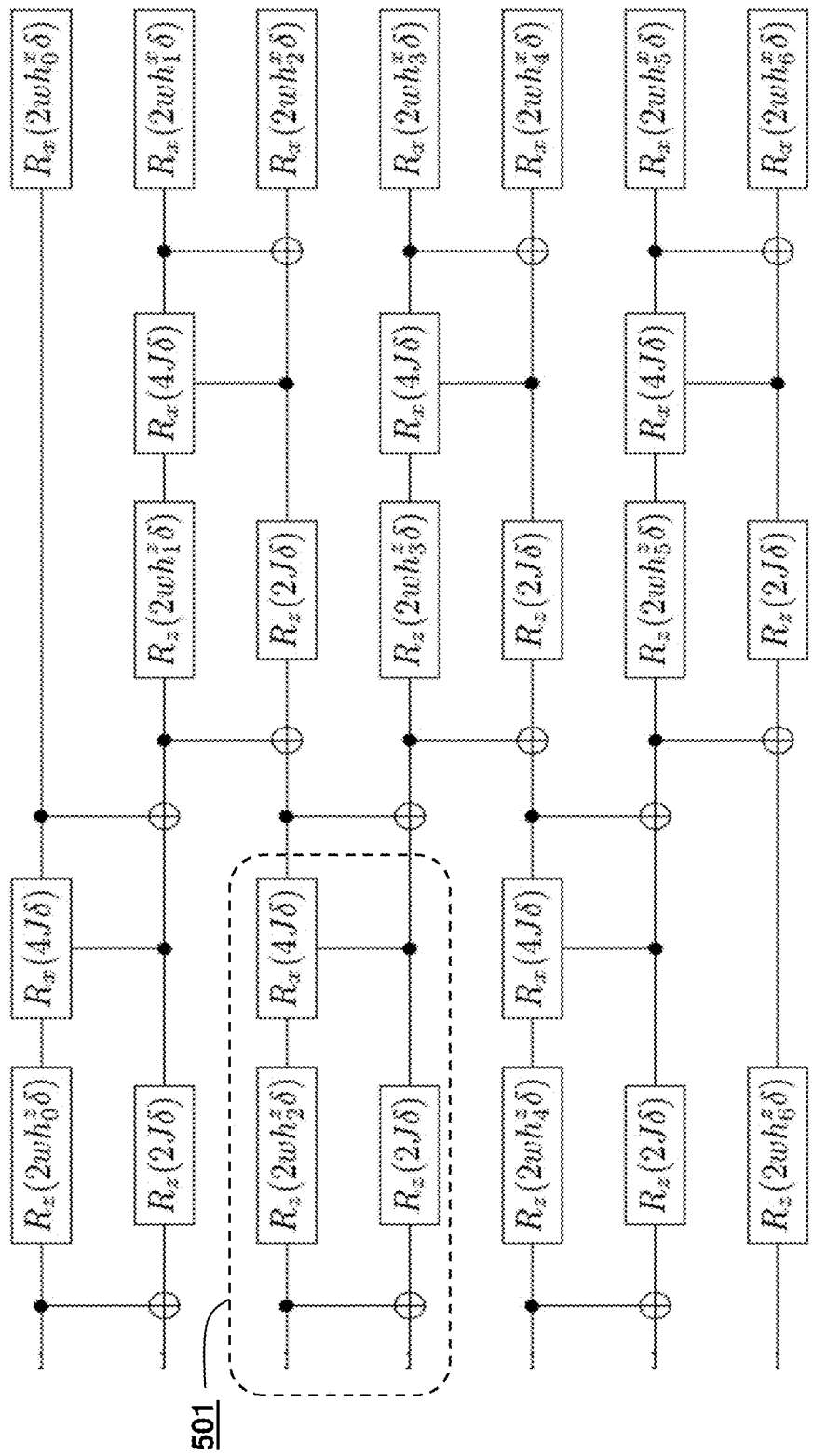

To further guide the analysis and discussion, a concrete example is illustrated in FIG. 5A, which shows a quantum circuit for a many-body disordered Hamiltonian to be time-evolved. Note that the angle through which $R_x$ and $R_y$ rotate are derived from several parameters. Particularly, $h_k^z$ and $h_k^x$ with $k \in \{0, 1, \ldots, 5, 6\}$ are randomly generated and are used to emulate large many-body systems that require many more number of qubits than what the underlying quantum chip supports.

One example of a quantum program that uses this circuit for a portion of its computation is illustrated in FIG. 5B which includes a mixture of quantum instructions and non-quantum instructions (as indicated by the comments to the right of the source code). In this example, NR is the number of disorder realizations (i.e. multiple small random realizations to emulate a large many-body system), NQ is the number of Qubits, NP is the number of iterations in order to achieve the required precision on Probability (Pr), NT is the number of Trotter steps, and a[i] accumulates Qubit measurement. The probability of qubits being in state |0> or |1> is obtained by repeating measurements (NP) and averaging.

This program structure shows how classical operations and quantum operations may be tightly intertwined and executed on the classical-quantum processing architectures described herein. The most efficient way to execute this program is to process all instructions in a pipeline such as those described above, with the quantum engine functional units 204E for controlling qubits configured as execution engine peer to other classical execution engines 204A-B (such as integer, floating point, etc.).

Figure 6A:
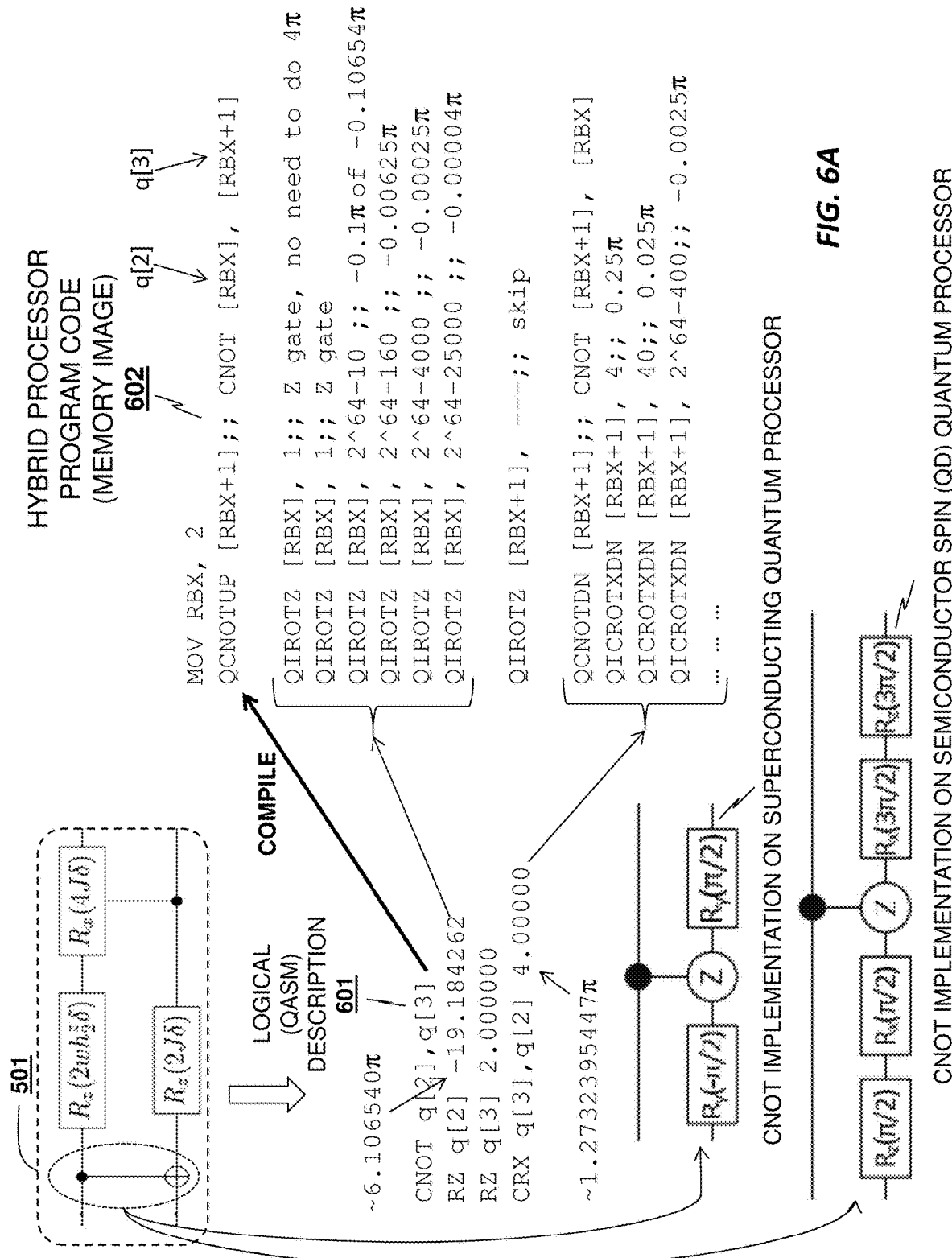
FIGS. 6A-B illustrate an example in which quantum instructions are generated by a compiler, decoded into uops, and executed within a quantum execution engine.
Figure 6B:
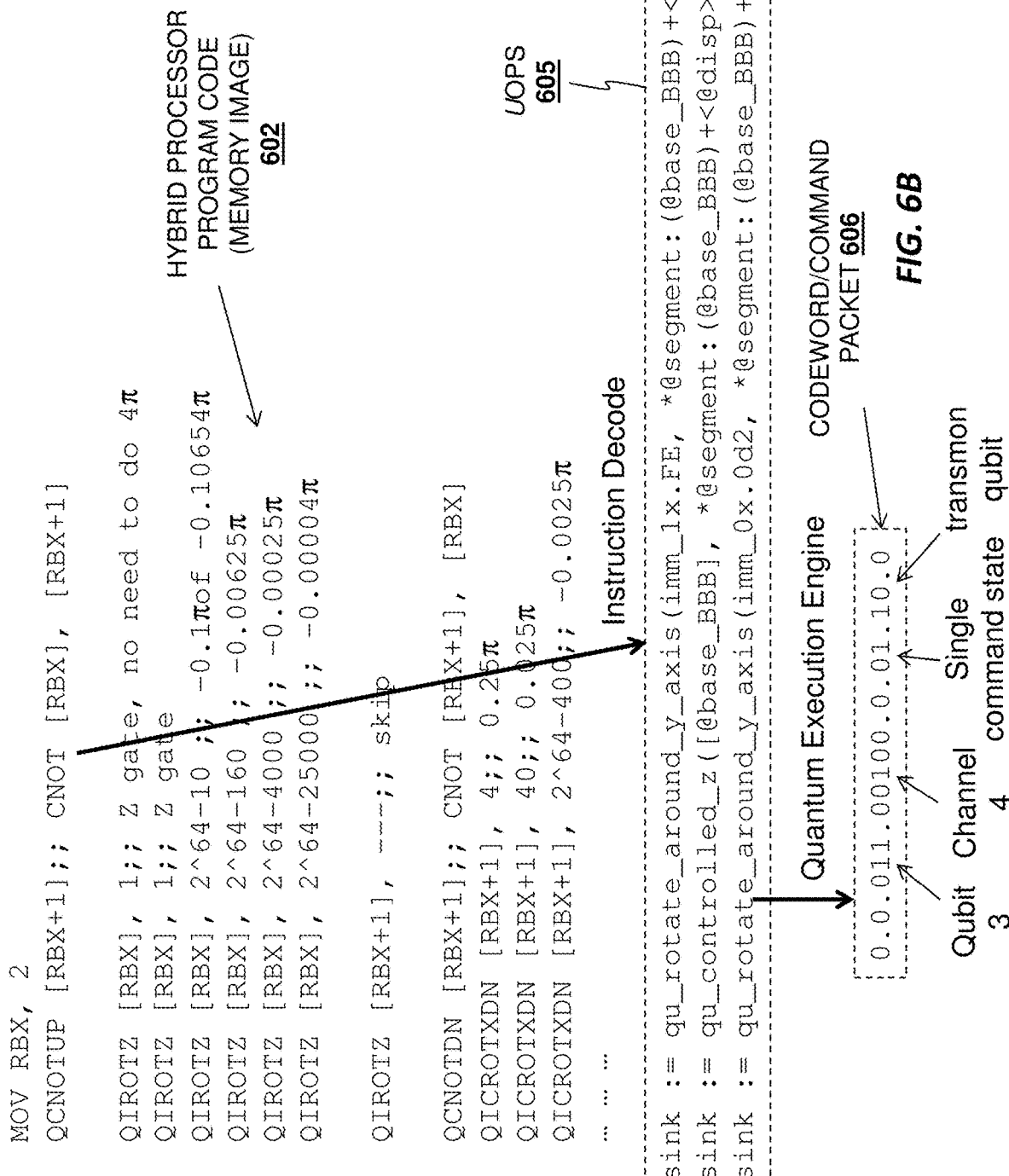

FIGS. 6A-B provide an example of the quantum operations performed in response to the program code in FIG. 5A. In particular, FIG. 6A illustrates a portion of quantum assembly language (QASM) code 601 to implement the highlighted portion 501 of the quantum circuit in FIG. 5A. The QASM code 601 is compiled into hybrid processor program code 602 in memory 205. In this example, the registers RBX and RBX+1 from the shared register file 321 or 204B are used to hold qubit indices to address logical qubits #2 and #3, respectively, in this particular example. The mapping of the relevant portions of the QASM code 601 to the hybrid processor program code 602 is indicated by arrows.

FIG. 6B illustrates how a quantum macroinstruction QCNOTUP (to implement a CNOT gate) is decoded into a series of uops 605 by the decoder 202. The uops 605 are executed by the quantum engine functional units 204E to generate codewords with a specified codeword or command packet format 606. In one particular format, a first data field indicates the qubit on which the operation is to be performed (qubit 3 in the example), a second data field indicates the channel over which the operation is to be transmitted (channel 4), a third field to indicate the command state (e.g., single command state), and a fourth data field to indicate the type of qubit (a transmon qubit). Of course, the underlying principles of the invention are not limited to any particular encoding format.

A method in accordance with one embodiment of the invention is illustrated in FIG. 7. The method may be implemented within the context of the processor architectures described above but is not limited to any particular processor or system architecture.

At 701 source code containing quantum instructions is compiled to generate runtime program code with quantum and non-quantum instructions. At 702 the quantum/non-quantum instructions are fetched from memory and stored in a local cache (e.g., the L1 instruction cache) or instruction buffer. As mentioned, quantum instructions may be freely mixed with non-quantum instructions within the pipeline.

At 703 the quantum and non-quantum instructions are decoded into sets of quantum and non-quantum uops, respectively, and stored in a queue prior to execution. At 704 the quantum/non-quantum uops are scheduled for execution based on uop and/or resource dependencies. For example, if a first uop is dependent on the results of a second uop then the first uop may be scheduled for execution only when the data produced by the second uop is available in one of the registers. Similarly, if a particular functional unit is busy, then the scheduler may wait for an indication that the functional unit is available before scheduling a uop which requires that functional unit. Various other/additional scheduling techniques may be implemented (e.g., scheduling based on priority, register load, etc).

At 705 the quantum uops and non-quantum uops are executed on their respective functional units within the execution circuitry. As mentioned, the shared register set may be used to store the source and destination operands required by these uops.

At 706, the results generated by the execution of the quantum uops may be used as input to an interface unit to control the quantum state of the qubits in a quantum processor. In one embodiment, a series of codewords or command packets may be generated which identify a quantum channel, one or more qubits within a quantum processor, a qubit type and/or a command state. The specific physical operations performed in response to the codeword or command packet is based on the underlying type of quantum processor used.

The embodiments described herein integrates quantum instructions within an existing processor pipeline. Because of the tight integration, these embodiments significantly reduces the various overheads/bottlenecks associated with current co-processor designs. These overheads/bottlenecks include, for example, the communication between the classical computation layers/modules and the quantum computation layers/modules in the software stack and between the classical CPU and the quantum chip via the message queue. Given the relatively small size of quantum routines, the current GPU-like co-processor implementations are inefficient.

Due to increased classical processing capabilities, hybrid co-processor models reduce some of the overhead. In one particular implementation which supports the hybrid co-processor model, many new micro-architecture mechanisms were introduced. However, these micro-architectural mechanisms were ambiguously defined as was the boundary between the classical CPU and quantum co-processor.

In contrast, in the hybrid architecture described herein, the classical computation pipeline is equipped to fully support a defined set of quantum instructions which may be freely mixed with non-quantum instructions both at the front end of the pipeline (i.e., at the macroinstruction level) and within the back-end of the pipeline (e.g., where quantum uops are mixed with non-quantum uops) and executed on functional units within the execution circuitry of the processor.

Scalable Qubit Addressing Mode for Quantum Execution Engine and/or Co-Processor

In quantum computing, a qubit is a unit of quantum information which is the quantum analogue of a classical binary bit. The computation is achieved by applying quantum gates, representing quantum logical operations, directly to qubits. Mathematically, this computing process is described as qubits undergo unitary transformations. Upon completion of computation, qubits are measured to gain information about the qubit states.

Therefore, to describe a quantum operation, it is necessary to identify the qubit or set of qubits to which the operation is applied. In a quantum program, each quantum instruction needs to encode both an operation to be performed and one or more qubits on which to perform the operation. In existing quantum instruction set architectures (e.g., QASM, Open QASM, QIS, etc) register operands are normally encoded in the opcode of an instruction. This scheme works for classical computing because the number of registers are very limited (e.g., 16, 32, 64, etc). However, this scheme is not scalable for quantum computing as quantum instructions will ultimately need to address a very large numbers of qubits. Consequently, encoding qubit addresses in the opcode field of quantum instructions would explode the instruction width.

As described above, in one embodiment, quantum instructions and non-quantum instructions are processed together within a shared processor pipeline. As such, the quantum instructions may rely on the same addressing modes as those available to the non-quantum instructions. The qubits in this embodiment are therefore addressed in a similar manner as non-quantum instructions which access system memory, providing a sufficiently large address space to accommodate a large number of qubits.

Figure 8:
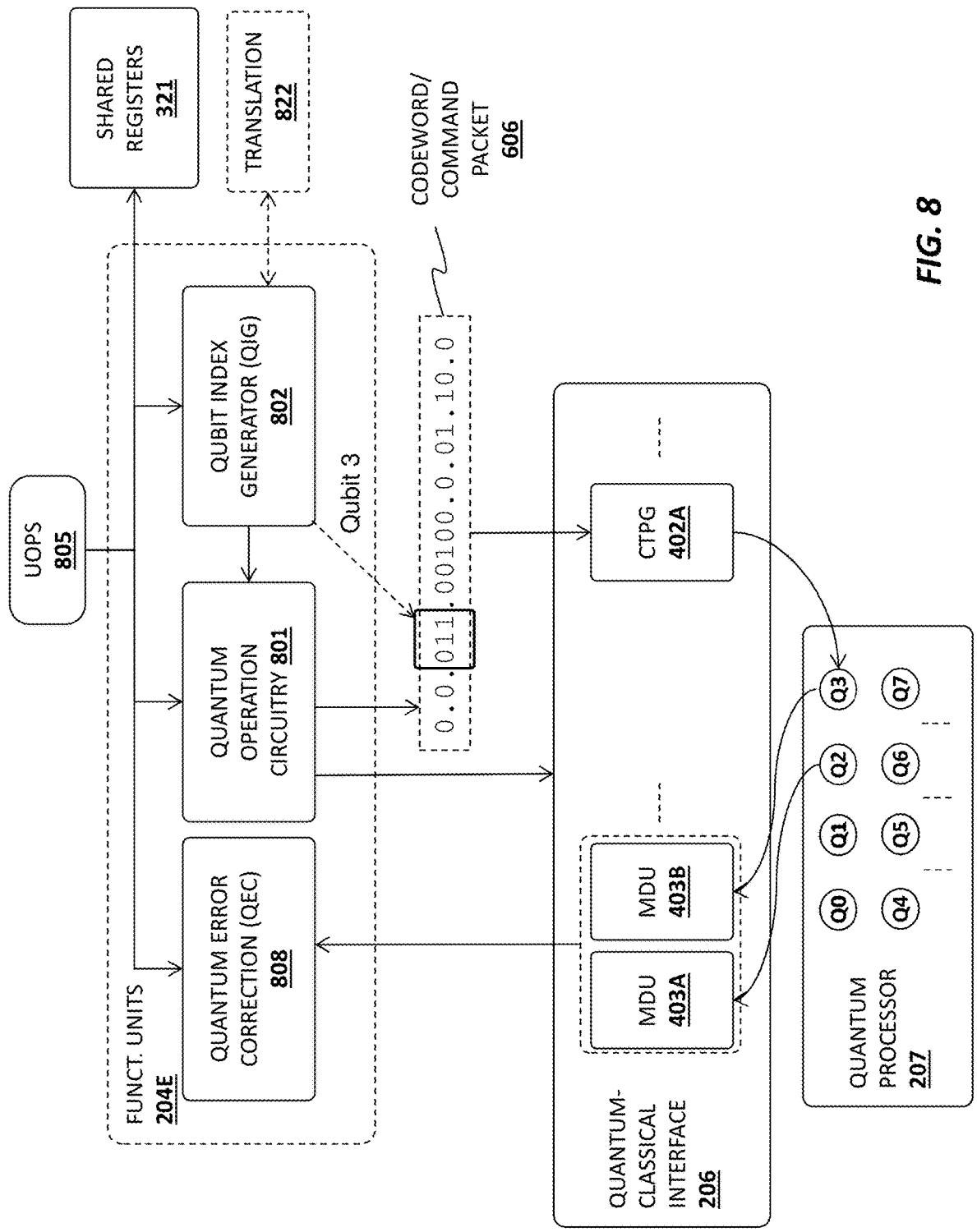
FIG. 8 illustrates one embodiment of a qubit index generator for addressing qubits within a quantum processor.

As illustrated in FIG. 8, in this embodiment, the quantum engine functional units 204E include a qubit index generation unit (QIG) 802 which determines a qubit index value or qubit ID in response to one or more uops 805. One or more quantum operation units 801 process the operations specified by the uops. The qubit index value (e.g., 011 for qubit 3 in the example) is then incorporated within the codeword/command packet 606, potentially along with one or more commands generated by the quantum operation unit 801 in response to processing the uops 805.

The QIG 802 may operate in accordance with different addressing modes supported by the processor. In one embodiment, the instruction identifies one of the shared registers 321 which contains the qubit index value (sometimes also referred to as a qubit ID). It may then use the qubit index value to identify the qubit within the codeword/command packet 606 and/or perform an operation using the qubit index value to generate one or more additional qubit index values. For example, it may add the qubit ID value to an integer specified by the uop to generate a second qubit ID.

The following examples demonstrate one way in which the QIG 802 generates qubit IDs in response to uops using an x86 assembly syntax. These operations may be performed within an x86 pipeline extended to support quantum instructions. However, the same general principles may be implemented on any processor architecture.

The single qubit instruction "QIROTX [RDI], 1" applies an X gate to the qubit number stored in RDI. Thus, if RDI contains 5, the X gate is applied to qubit number 5. In this example, the QIG 802 determines the qubit ID simply by reading the value stored in RDI (which is one of the shared registers 321 in this example). In this embodiment, the RDI value was stored previously by another uop. As another example, if the architecture register RBX contains a value of 2, then the two qubit instruction "QCNOTUP [RBX+3]," applies a CNOT operation with qubit 2 (q[2]) being the control qubit and qubit 5 (q[5]) being the target qubit. The QIG interprets the [RBX+3] notation as: the ID of the control qubit is stored in RBX and the ID of the control qubit+3 is the target qubit ID. Thus, the addressing scheme is extended so that two different qubits can be addressed with a single instruction, (i.e., CNOT). In contrast, in classical computing, only one memory location is addressed per instruction.

FIG. 8 also illustrates a codeword triggered pulse generator (CTPG) 402A which includes control logic and an analog-to-digital converter for interpreting the codeword/command packet 606 to identify one or more qubits (Q3 in the example) and generate a sequence of pulses to implement the specified quantum operations. When all of the quantum operations have been performed, as specified by the program code 205C, the quantum operation circuitry 801 and QIG 802 generates a codeword/command packet 606, causing one or more MDUs 403A-B to take a measurement of one or more qubits (as specified by the QIG 802 which generates the qubits indices). As mentioned, the MDUs include analog-to-digital circuitry to convert the analog measurements to digital values, which are then processed by a quantum error correction unit 808 to detect and potentially correct errors. If valid result data has been received it may be stored within one or more of the shared registers 321 and/or accumulated with prior measurement data. In addition to error correction, the measurement can also be used for program flow control based on measurement feedback.

The quantum error correction unit 808 may implement various techniques for detecting and correcting quantum errors. For example, in one embodiment, an error decoder (within the QEC unit 808) decodes a multi-qubit measurement from the quantum processor 207 to determine whether an error has occurred and, if so, implements corrective measures (is possible). The error measurements may be taken from multiple qubits in a manner which does not disturb the quantum information in the encoded state of the qubits (e.g., using ancilla qubits). In response, the QEC unit 808 generates error syndrome data from which it may identify the errors that have occurred and implement corrective operations. In one embodiment, the error syndrome data comprises a stabilizer code such as a surface code. In some cases, the response may simply be to reinitialize the qbits and start over. In other cases, however, modifications to the quantum algorithm implemented in the quantum program code 205C can be made to stabilize the region of the quantum processor responsible for the error (e.g., where compiler 205B includes a just-in-time (JIT) compiler). In either case, the CTPGs 402A perform the underlying physical operations under the control of the codewords/command packets 606 generated by the QEFU 204E. For example, the CTPG 402A may generate electromagnetic pulses to adjust the phase of one or more qbits in accordance with the detected phase error, or to reset the phase/spin of all qbits if re-initialization is required.

Addressing qubits in a manner which is similar to how classical CPU's address memory provides the scalability characteristics/attributes required for future quantum processor implementations. In particular, the above-described embodiments provide qubit indexing which is seamlessly integrated within an existing processor ISA and scales to a large number of qubit systems. These embodiments also remove pressure from the quantum instruction opcode space by way of a quantum extension to x86 or other architectures to address the qubit space and integrate quantum operations to existing processor pipelines.

Figure 9:
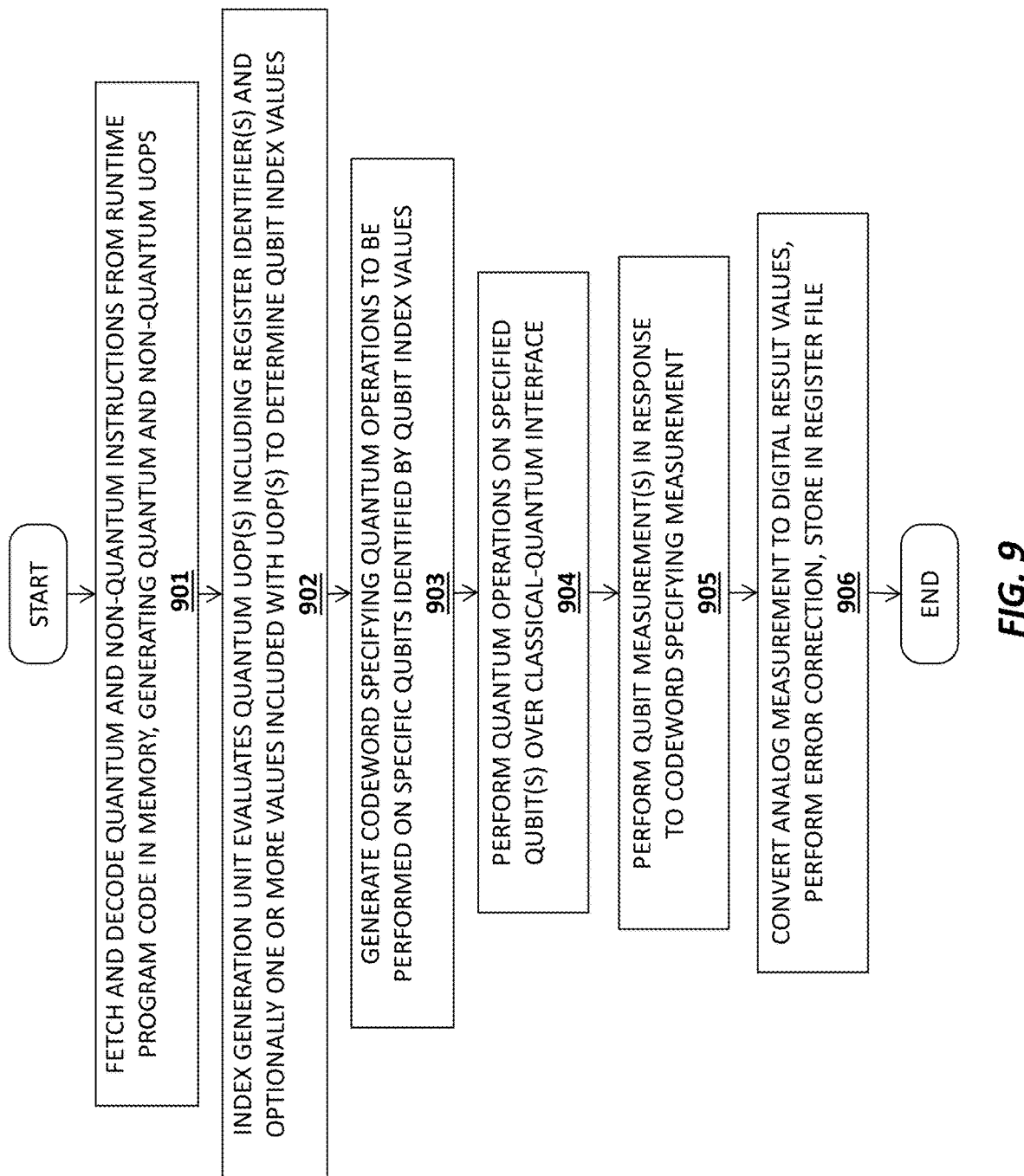
FIG. 9 illustrates a method for determining qubit index values for identifying qubits.

A method in accordance with one embodiment of the invention is illustrated in FIG. 9. The method may be implemented on the architectures described above but is not limited to any particular processor or system architecture.

At 901 quantum and non-quantum instructions from runtime program code are fetched and decoded, generating quantum and non-quantum uops. At 902 an index generation unit evaluates quantum uops including register identifiers and optionally one or more values included with the uops to determine qubit index values. As described above, the indices may be generated using a variety of techniques including reading qubit index values from registers identified by the uops and generating additional qubit index values using integer values included with the uops.

At 903, the quantum execution circuitry generates a codeword specifying the quantum operations to be performed on the qubits identified by the calculated qubit index values. At 904, the quantum operations are performed on the specified qubits. At 905, qubit measurements are performed in response to another codeword generated based on additional uops. At 906, the analog measurement made on one or more of the qubits are converted to digital values. Error correction and/or flow control may then be performed based on the resulted digital result values stored in a register file of the processor.

Figure 10:
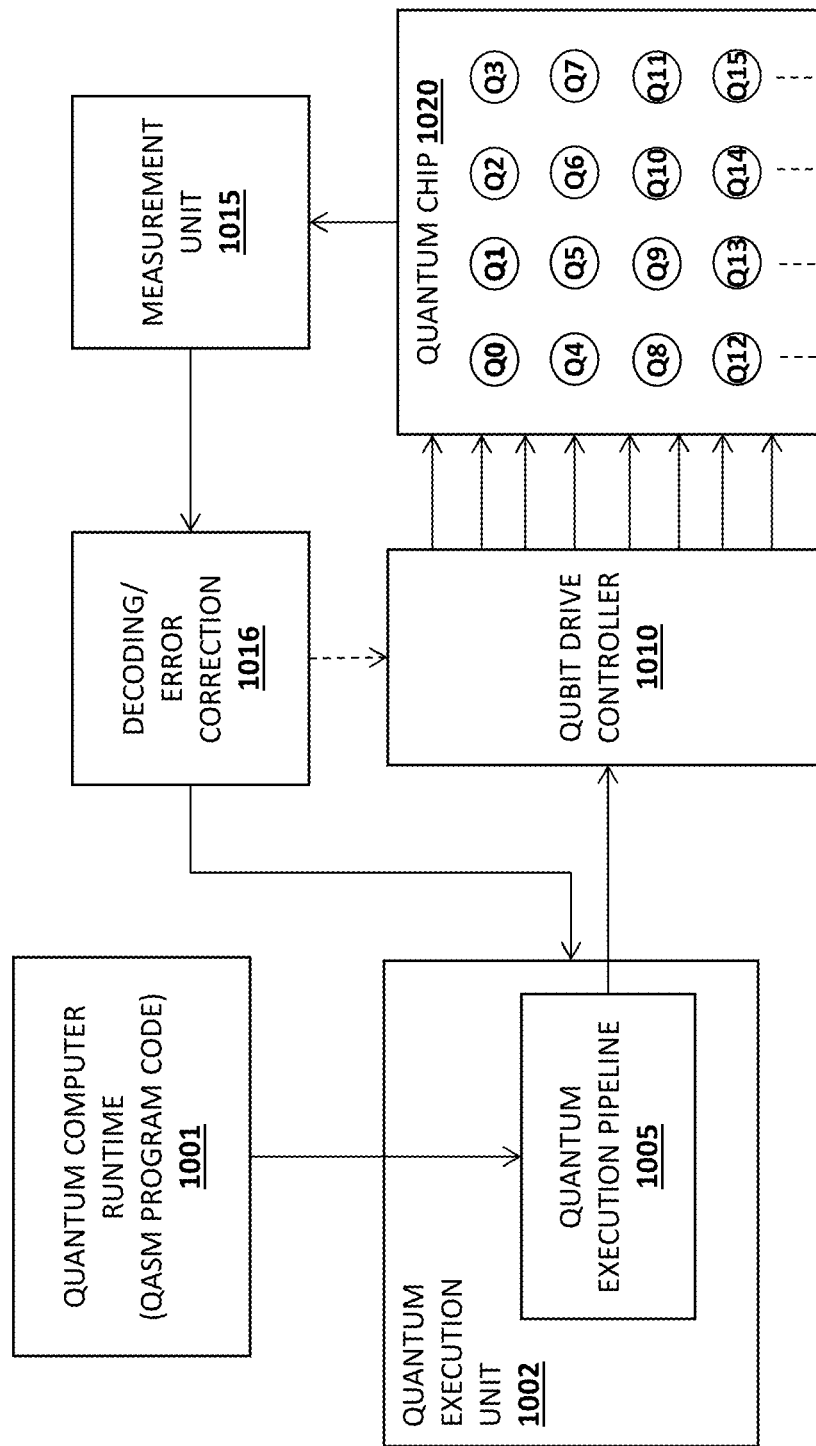
FIG. 10 illustrates an example of a system which decodes and corrects quantum errors.

FIG. 10 illustrates a typical quantum computer arrangement with error detection and correction. The illustrated example includes a quantum computer runtime 1001 (e.g., implemented in QASM program code), which is executed by a quantum execution pipeline 1005 of a quantum execution unit 1002. By way of example, and not limitation, the quantum execution unit 1002 may be an application-specific integrated circuit ASIC, a general purpose processor, or a programmable functional unit for executing quantum instructions.

In response to execution of the quantum program code, the quantum execution pipeline 1005 transmits commands to a qubit drive controller 1010 which performs the physical quantum operations on the quantum chip 1020. Depending on the implementation, this may be accomplished by a sequence of RF pulses to manipulate the qubits Q0-Q15 of the quantum chip 1020.

After all or a certain number of program operations have completed, a measurement unit 1015 reads/estimates the quantum state of one or more of the qubits Q0-Q15 and provides the measurement results to a decoding/error correction unit 1016 which decodes the measurements using error correction decoding techniques. For example, the decoding/error correction unit 1016 decodes a multi-qubit measurement from the quantum processor 1020 to determine whether an error has occurred and, if so, implements corrective measures if possible. The error measurements may be taken from multiple qubits in a manner which does not disturb the quantum information in the encoded state of the qubits (e.g., using ancilla qubits). In response, error syndrome data may be generated from which errors and corrective operations may be identified. In one embodiment, the error syndrome data comprises a stabilizer code such as a surface code. In some cases, the response may simply be to reinitialize the qbits Q0-Q15 and start over. In other cases, however, modifications to the quantum algorithm may be implemented in the quantum program code 1001.

The decoded/corrected results are provided to the quantum execution unit 1002 for further processing in accordance with the quantum runtime 1001. The typical operational flow of current quantum computer designs based on a fixed cycle time for each quantum operation executed by the quantum execution pipeline 1005 and each measurement taken by the measurement unit 1015.

Figure 11:
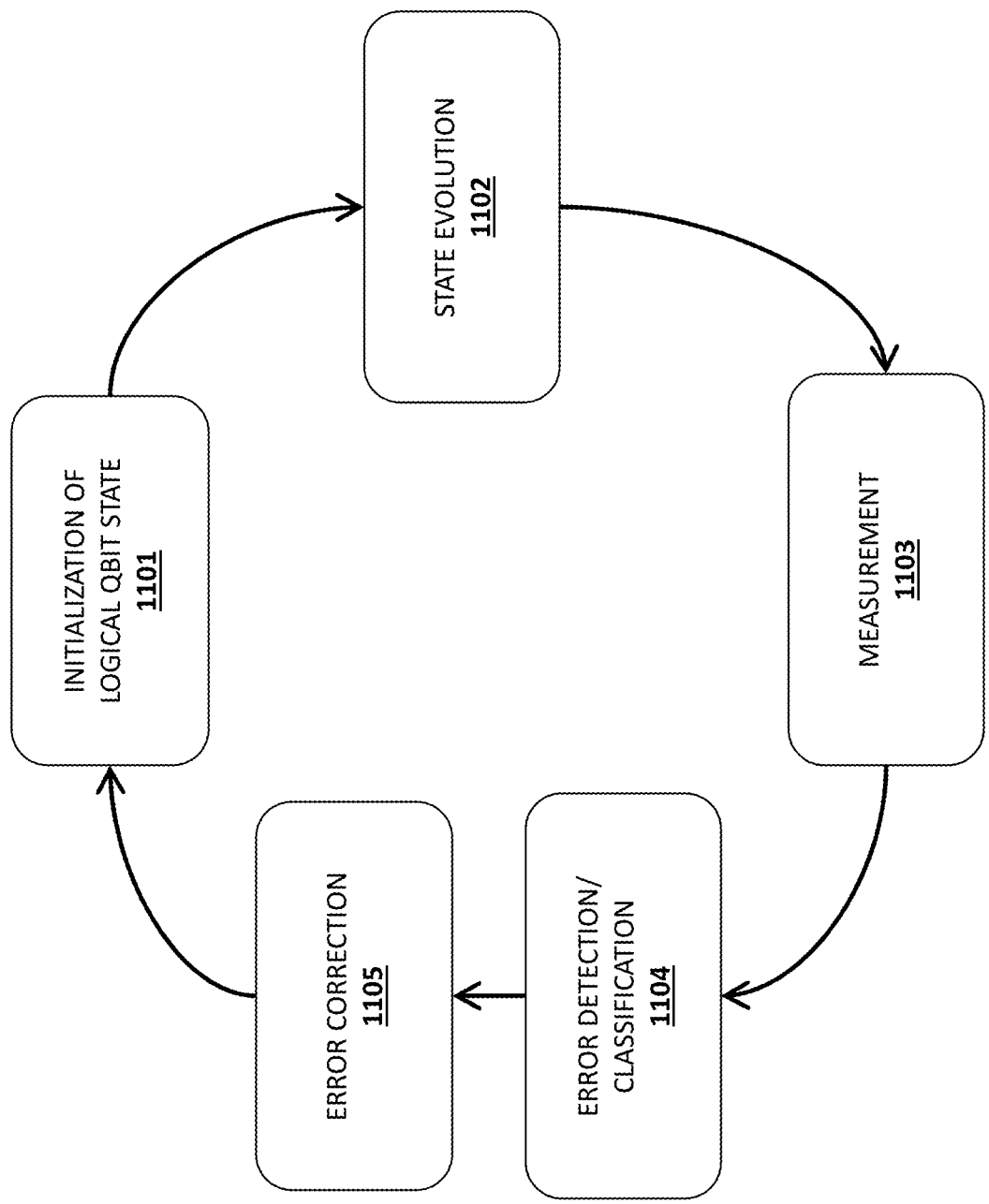
FIG. 11 illustrates a typical quantum error correction cycle.

FIG. 11 illustrates one embodiment of a quantum error correction cycle which may be implemented by the architectures described herein. At 1101 the logical qubit state of the system is initialized. For example, if electron spin is used as the quantum state, then electrons within the quantum system may be prepared (e.g., initialized to a particular spin orientation and/or entangled using electromagnetic control signals from the quantum controller).

At 1102, the state of the quantum system evolves in response to additional electromagnetic inputs specified by the quantum runtime 1001 and implemented by the quantum controller 1010. For example, different sets of qubits, including ancilla qubits, may be entangled and manipulated in accordance with the quantum runtime 1001.

At 1103, a measurement of the quantum system is taken. For example, the current spin of one of the entangled electrons may be measured. The system may subsequently be re-initialized prior to the next measurement (i.e., given that taking a measurement or learning any information about the quantum system disrupts the quantum state). The physical qubits may be periodically measured during each error correction cycle.

At 1104 error detection/classification is performed on the measured results to determine whether an error has occurred. The error cycle completes with an error correction operation at 1105 using a specified set of codes, which attempts to correct any detected errors.

Hybrid Compilation Apparatus and Method for Quantum-Classical Code Sequences

The quantum algorithm execution flow for current quantum computing systems consists of compiling a long list of quantum logic gates organized into a quantum circuit and executed serially on a collection of laboratory instruments which generate a sequence of RF pulses to manipulate the qubits of a quantum processor (e.g., such as arbitrary waveform generators).

There is very little interaction and feedback between the quantum algorithm running on the accelerator and a classical processor or control unit. This is due to the fact that few mechanisms exist for integrating the quantum computing logic with classical logic using the tools available and developed over 60 years of classical computing.

The implementations described below leverage exiting classical tools to provide a sophisticated runtime management of instruction flows for both the quantum accelerator hardware (sometimes referred to below as a quantum controller) and the classical computing hardware. In particular, standard compilation tools such as the compiler, linker, and assembler and OS supporting tools such as libraries and program loaders are extended to implement a new quantum runtime library for managing the interplay of quantum accelerator logic and classical instruction flow. This is accomplished, in part, by augmenting an OS loader file (an Executable and Linkable Format (ELF) file). In addition, Quantum Basic Blocks (QBBs) are defined and implemented which group quantum-accelerated portions of program code into quantum measurement terminated code blocks that are accessible by a quantum runtime library in the final executable.

Specifically, some embodiments of the invention include compiler front-end language extensions to support intrinsic quantum operations as part of the normal program writing flow. The quantum operators are specified with intrinsics which delineate blocks of quantum code intermixed with the native host processor code. In addition, certain embodiments perform compiler extraction of quantum basic blocks (QBBs) which can be linked into unified QBBs and stored using an extension of the Executable and Linking Format (ELF), referred to herein as ELF Quantum or ELFQ.

In addition, at least some embodiments of the invention include a quantum run-time environment that allows the classical host code to trigger upload and processing of the quantum basic blocks at the correct location in the program-executable control flow. These embodiments ensure that the correct block IDs are loaded and issued at the right moment and report back results in specified CPU registers or memory locations for further handling on the classical processing side.

A quantum accelerator and a classical host processor can be configured to interact in various ways. At one extreme, there may be limited or no interaction between the classical processor and the quantum accelerator ("non-interacting" or "pure quantum" implementations). This represents the systems used by the quantum computing community today. In these implementations, the host processor simply maintains a loop counter and keeps issuing the same basic block of quantum accelerated code and awaits measurement results. There is no classical-quantum interaction through branches.

A software-driven "hybrid" quantum system is controlled via classical software, which provides for a selection between quantum blocks based on a classical variable and also allows the movement of qubit state into registers of the host processor. The state may then be used to select a new quantum block. The hybrid approach is being seriously explored in the quantum computing community today.

A hardware-driven hybrid quantum system allows full interaction between the quantum accelerator code and classical host processor instructions. The hardware-driven hybrid approach allows for a simplified compiler and reduces the need for an ELFQ extended format. However, this approach has not been seriously considered by the quantum community due, at least in part, to cost and the time to develop such a system. Such a system leverages speed of execution but introduces integration problems and noise problems (and increased errors) resulting from classical processing overhead. Moreover, to be fully integrated, a classical processor would need to operate at quantum refrigeration temperatures (e.g., 0 mKelvin) which is not currently possible.

To address the above limitations, the embodiments of the invention include a sophisticated compilation tool chain to manage all three of these interaction scenarios.

Figure 12:
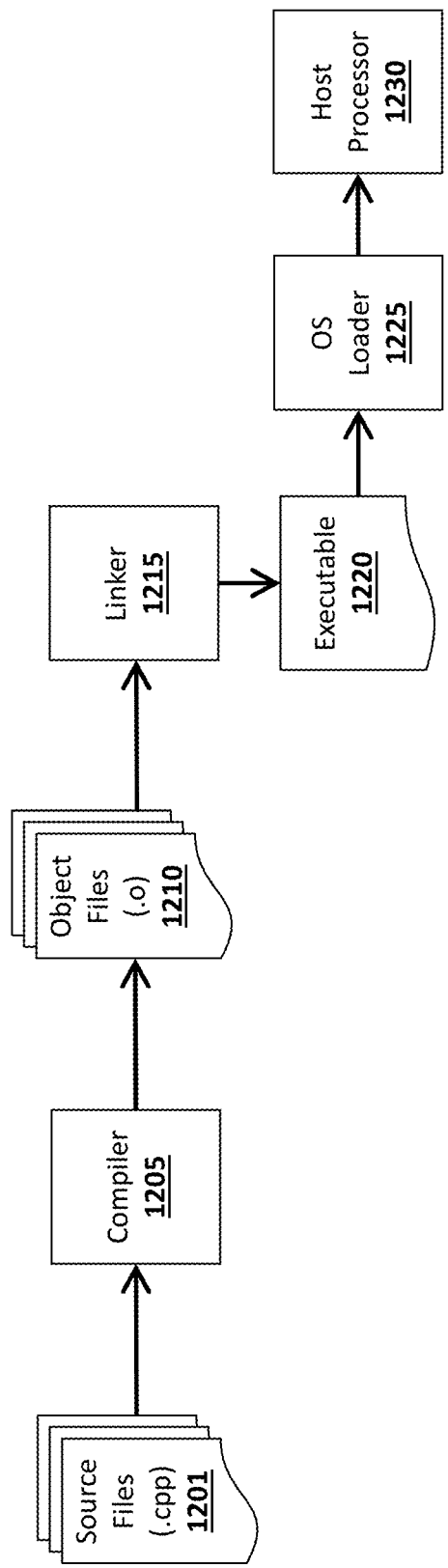
FIG. 12 illustrates a sequence of operations for compiling source code and linking object files.

FIG. 12 illustrates an overview of how a classical program is compiled, loaded and run on a modern computer system. A compiler 1205 translates source files 1201 written in a particular programming language (e.g., such as C++, Python, etc) to generate object files 1210. A linker 1215 links multiple object files 1210 together to form an executable file 1220, which is then loaded into memory by an OS loader 1225 and executed on the host processor 1230.

Figure 13:
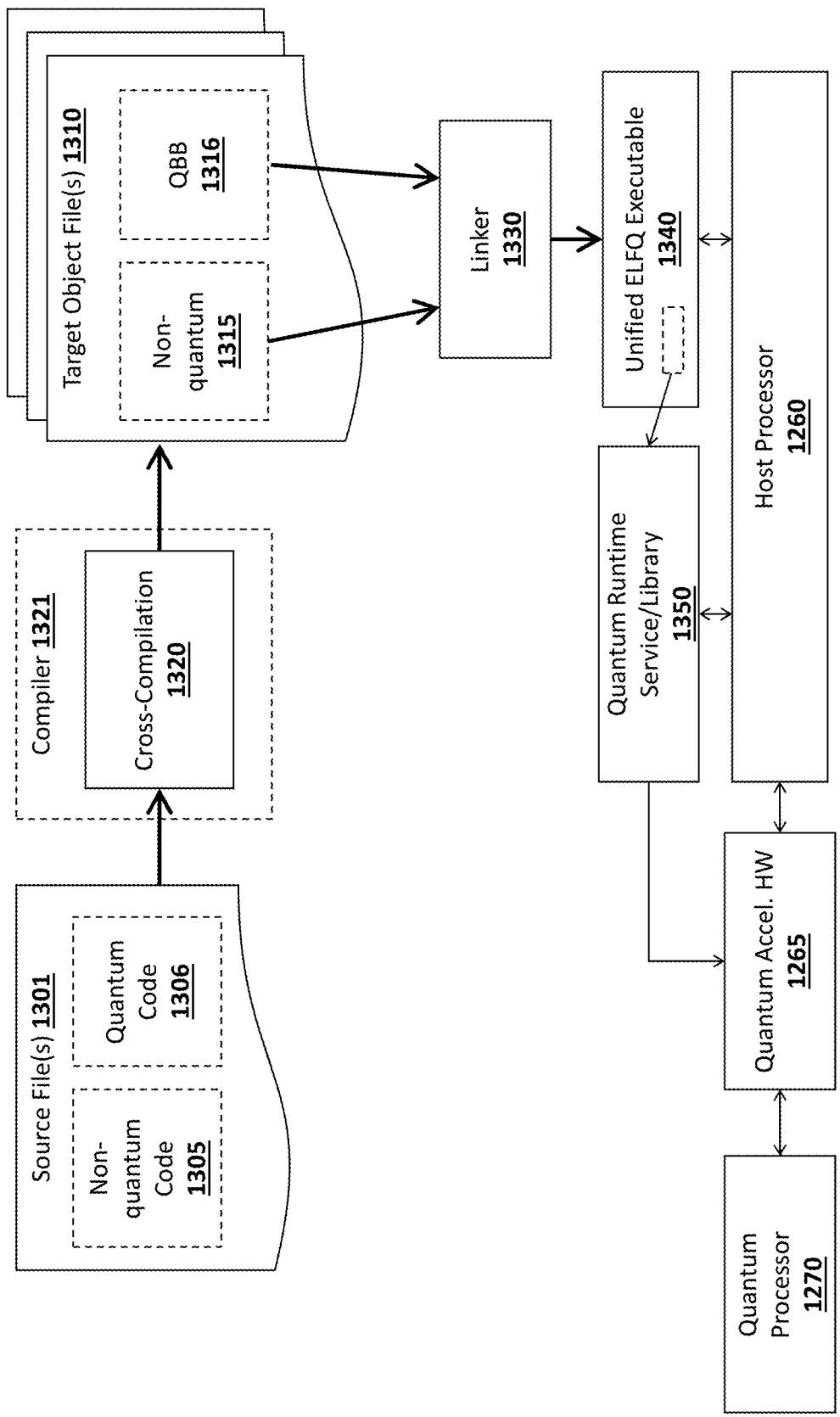
FIG. 13 illustrates one embodiment in which non-quantum code and quantum code from a unified source file are compiled and linked using a quantum runtime service/library.

Referring to FIG. 13, a compiler 1321 in accordance with embodiments of the invention includes cross-compilation logic 1320 to compile hybrid source files 1301 containing a combination of non-quantum source code 1305 and quantum source code 1306. The non-quantum source code specifies operations to be performed on a classical processor and the quantum source code 1306 specifies qubit operations to be executed by a quantum controller, sometimes referred to herein as quantum acceleration hardware.

The cross-compilation logic 1320 extracts blocks of quantum operations or instructions 1306 generated based on the source code 1301 and compiles them into quantum basic block (QBB) target object files 1316 (or into QBB sections of the target object files). The cross-compilation logic 1320 also compiles the non-quantum code 1305 into non-quantum target object files 1315 (or non-quantum sections of the target object files). In at least one embodiment, the cross-compilation logic 1320 forms these quantum basic blocks of code 1316 by detecting sequences of quantum operations or instructions generated from the program source file 1301, grouping them together, and bounding them with classical host processor operations/instructions (e.g., immediately before and after each quantum basic block). If the cross-compilation logic 1320 detects a quantum measurement as it is scanning the quantum operations/instructions then it will terminate the quantum basic block and start a new quantum basic block directly following the measurement. This quantum basic block delineation process allows quantum algorithms to be accommodated which are designed to do quantum error correction cycles through parity measurements. A quantum basic block can be as short as a single pair of parity measurements or as long as a full quantum program.

When the cross compiler logic 1301 has found a quantum basic block and delineated it, it injects a call to the quantum runtime service (QRTS) module with the block identifier for the QBBs. This allows the classical compiler 1321 toolchain to compile the source code 1301 classically without any knowledge of the quantum accelerator sequences.

During the link stage, the linker 1330 assembles the cross-compiled quantum basic blocks object files 1316 and the classical/non-quantum object files 1315 generated by compiling the source code with the injected quantum runtime service (QRTS) 1350 function calls into a unified Executable and Linker Format for Quantum (ELFQ) file 1340. The ELFQ file format is extended to contain a new section called ".qbbs" that contains a table structure for listing the individual QBBs. Each QBB is delineated by a table entry in the .qbbs table section header. It is the job of the linker 1330 to assemble the quantum basic block sections 1316 in each object file into one or more unified QBB sections in the extended ELFQ file 1340.

The final compiled ELFQ executable 1340 includes not only the classical code but a quantum runtime library (QRTL) 1350 that, when executed on the host processor 1260, extracts the ELFQ quantum basic block instructions from the ELFQ executable 1340 and issues them to the quantum accelerator hardware 1265, which responsively controls qubits in a quantum processor 1270. During program execution the quantum runtime service (QRTS) 1350 causes the host processor 1260 to issue the quantum basic blocks at the appropriate point in the program flow control, allowing hybrid operation of the quantum-classical computer. Although illustrated as a separate unit in FIG. 13, the quantum acceleration hardware 1265 (sometimes referred to as a quantum controller) may be integrated on the same chip or same package as the host processor 1260.

Thus, FIG. 13 illustrates a tool chain, flow, and process for combining classical and quantum program execution on a single host computer system. This sophisticated mode of operation is future-proof in the sense that it can accommodate this hybrid interaction for all quantum computer designs. When quantum instructions are integrated as first class operations in classical instruction sets, the QBBs can simply be removed and the ELFQ file used with no change to the compilation framework, runtime tools, or flow.

Hybrid Compilation and Execution Model for Quantum-Classical Variational Algorithms with Quantum Compiler Toolchain The following section builds on the concepts set forth above with additional hybrid classic/quantum compilation techniques as well as specific architectural arrangements and algorithms. It should be noted, however, that the underlying principles of the invention are not necessarily limited to these specific details.

Quantum computing has the potential to solve classically intractable problems. Current quantum computers in the Noisy Intermediate-Scale Quantum (NISQ) regime are limited by the total number of operations that can be performed reliably, as well as the total number of quantum bits (qubits) available. One of the most promising applications to demonstrate quantum speedup for NISQ systems are hybrid quantum-classical algorithms, such as variational quantum eigensolver (VQE) and quantum approximate optimization algorithm (QAOA). These applications depend on a tight relationship between classical computing and quantum accelerators during program execution.

Figure 14A:
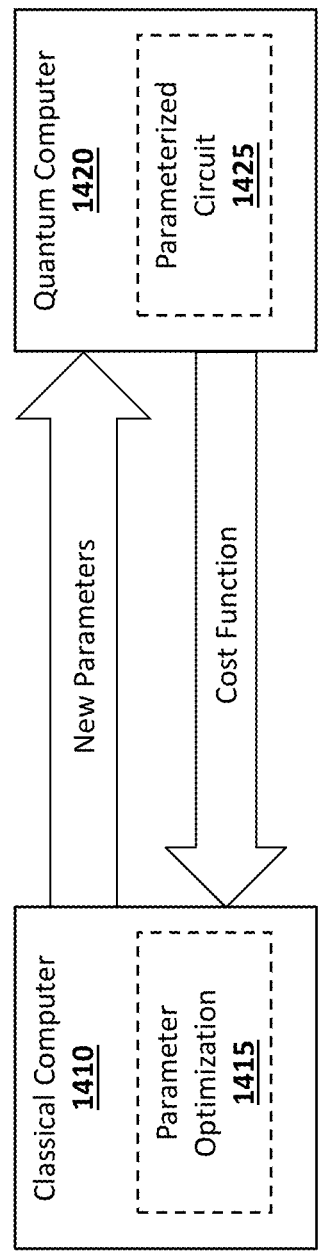
FIG. 14A illustrates an implementation for performing parameter optimization.

FIG. 14A illustrates a quantum-classical optimization loop implemented between a classical computer 1410 and quantum computer 1420. Parameter optimization logic 1415 executed on the classical computer 1410 trains parameters to be used by a parameterized circuit 1425 on the quantum computer 1420 by assessing each candidate solution. The parameters in the quantum circuit 1425 of each iteration depend on the previous results in the optimization loop. In variational algorithms, the rotation angles change in every iteration and are passed back as variational parameters for the next run of the optimization. Embodiments of the invention focus on the compiler and runtime techniques that allow programmers to design hybrid quantum-classical variational algorithms in a single C++ source code and generate a binary executable which performs classical computation on the host processor (e.g., a CPU or other processor type) and quantum computation on the quantum accelerator.

Some of the embodiments described herein include quantum extensions to the C++ programming language which leverage the LLVM infrastructure to compile a quantum program. The LLVM infrastructure is a set of compiler and toolchain technologies designed around a language-independent intermediate representation (IR) which is used to design front ends for programming languages and back ends for instruction set architecture.

Using C++ to handle the analysis and optimization of large quantum programs has proved to be faster than other higher-level languages such as Python. The embodiments described below adopt the programming language model originally demonstrated by Javadi Abhari etas, in *Parallel Computing* 45, 2 (2015), *Computing Frontiers* 2014, to the extent of defining custom datatypes, custom intrinsic functions and utilizing LLVM pass infrastructure. Furthermore, the embodiments of the invention described herein are designed for expressing hybrid quantum-classical algorithms, supporting dynamic parameters to quantum circuits with single compilation, a code generator for a qubit control processor, a quantum runtime library for managing execution, along with definition of an application binary interface (ABI) for executable.

The LLVM framework includes Clang—a compiler for the C family of languages, with a target-independent optimizer, an extensible backend for new targets and a linker. The frontend parses the input source program in a high-level programming language, performs lexical, syntactic, and semantic analyses, and generates a lower-level intermediate representation (IR) as the output. The optimizer stage is responsible for improving the execution performance. In LLVM, this is managed by transformation passes that translate the IR into an optimized IR. The backend is associated with a specific target machine (e.g., a particular X86 processor model), and performs code generation by mapping the IR to the target instruction set.

Figure 14B:
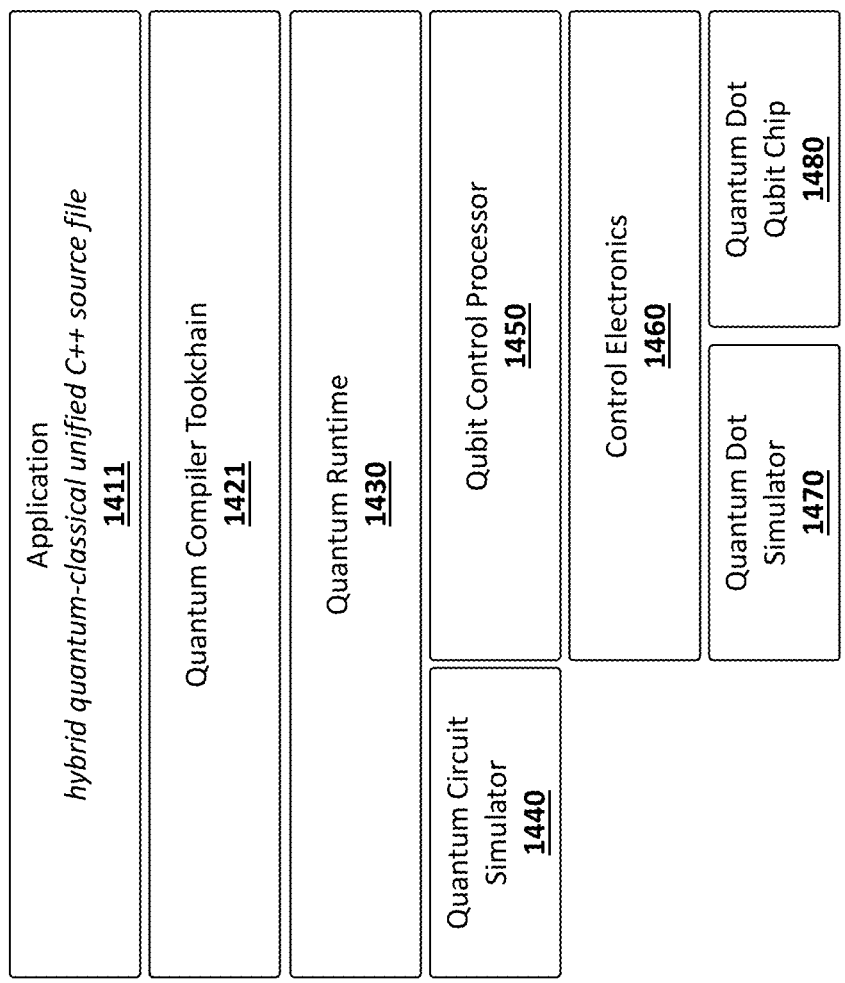
FIG. 14B illustrates a hardware/software stack in accordance with one implementation.

To enable the power of quantum computation, the embodiments of the invention include a full stack of system software and hardware. FIG. 14B illustrates one example of this layered architecture which includes a quantum compiler toolchain 1421 (e.g., LLVM-based) for translating application source code 1411 written in hybrid quantum-classical unified C++. The translated code is processed by a qubit control processor 1450 via a quantum runtime 1430, with the qubit control processor 1450, associated control electronics 1460, and backends performing quantum computations with well-defined interfaces. The modular design allows multiple components to be supported in each layer and any individual component to be easily swapped out.

The application 1411 includes a quantum algorithm and any relevant classical logic represented in C++ source code. The compiler toolchain 1421 translates this unified C++ source file into a binary executable. The quantum runtime 1430 provides library calls for managing quantum-classical interaction and communicating with qubit control processors 1450 that manage the execution on the quantum backend via control electronics 1460. The qubit backend can also be a quantum dot simulator 1470 or physical quantum dot qubit chip 1480.

A quantum circuit simulator 1440 such as the Intel Quantum Simulator (IQS) can directly interact with the quantum runtime 1430 interface and execute the quantum circuit. A quantum dot qubit chip 1480 or its equivalent simulator 1470 additionally needs the qubit control processor 1450 and supporting electronics 1460 for generating the necessary control signals.

Embodiments of the invention perform the compilation of quantum programs by extending the LLVM compiler framework, which allows programmers to leverage existing compiler techniques for quantum program analysis, optimization, and executable code generation.

In addition, at least some embodiments include a compilation and execution model for hybrid quantum-classical variational algorithms. Using the techniques described herein, the hybrid program 1411 only needs to be compiled once for the execution of multiple algorithm iterations, significantly reducing the execution latency.

A full-stack software platform including C++ quantum extensions, compiler, runtime, and simulator are described. Feasibility of these embodiments is demonstrated by running a hybrid quantum-classical algorithm that prepares thermal equilibrium states called Thermofield Double (TFD) states. This variational TFD algorithm is important to the application area of materials design or the simulation of complex electronic materials.

The quantum compiler toolchain 1420 provides a software platform that allows programmers to design, compile, and execute hybrid quantum-classical applications. In some implementations, the quantum compiler toolchain 1420 includes two components: a host compiler, which is an LLVM-based Clang compiler; and a device compiler, which is targeted to a quantum instruction set architecture (QuISA) as described herein.

Figure 15:
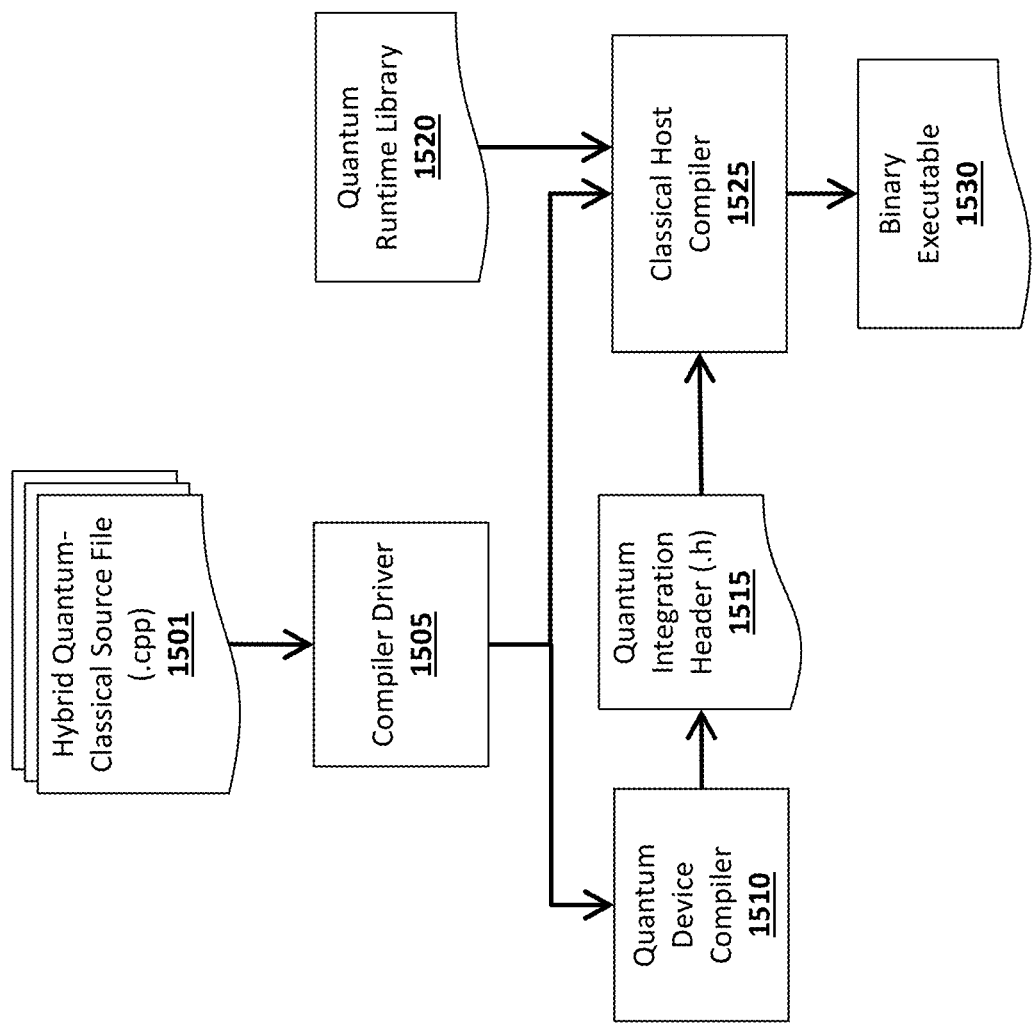
FIG. 15 illustrates an implementation including a quantum device compiler for generating a quantum integration header file.

FIG. 15 illustrates a hybrid compilation workflow in accordance with embodiments of the invention which supports the compilation of hybrid quantum-classical variational algorithms. The input to the compiler is a single source file 1501 (e.g., a C++ file in some embodiments) which represents the application layer, classical functions and quantum kernels. The compilation process is orchestrated by the compiler driver 1505 which logically splits the process into quantum device compilation flow and classical host compilation flow, and invokes the necessary components in the toolchain to process the input. The quantum compiler driver 1505 extracts the quantum kernels from the unified source code 1501 and passes them to the quantum device compiler 1510 which performs analysis and optimization of the quantum kernels, generating an integration header file 1515 that provides quantum kernel information, such as function names, symbols, function lengths, and macroinstructions for the runtime library. The host compiler 1525 receives the quantum integration header 1515, merges back the quantum logic with the classical logic, and links with the quantum runtime library 1520. Once all compilation processes are completed, the output binary executable 1530 is created in Executable and Linking Format (ELF) for Quantum (ELFQ). The ELFQ contains the required information to run hybrid applications.

Figure 16:
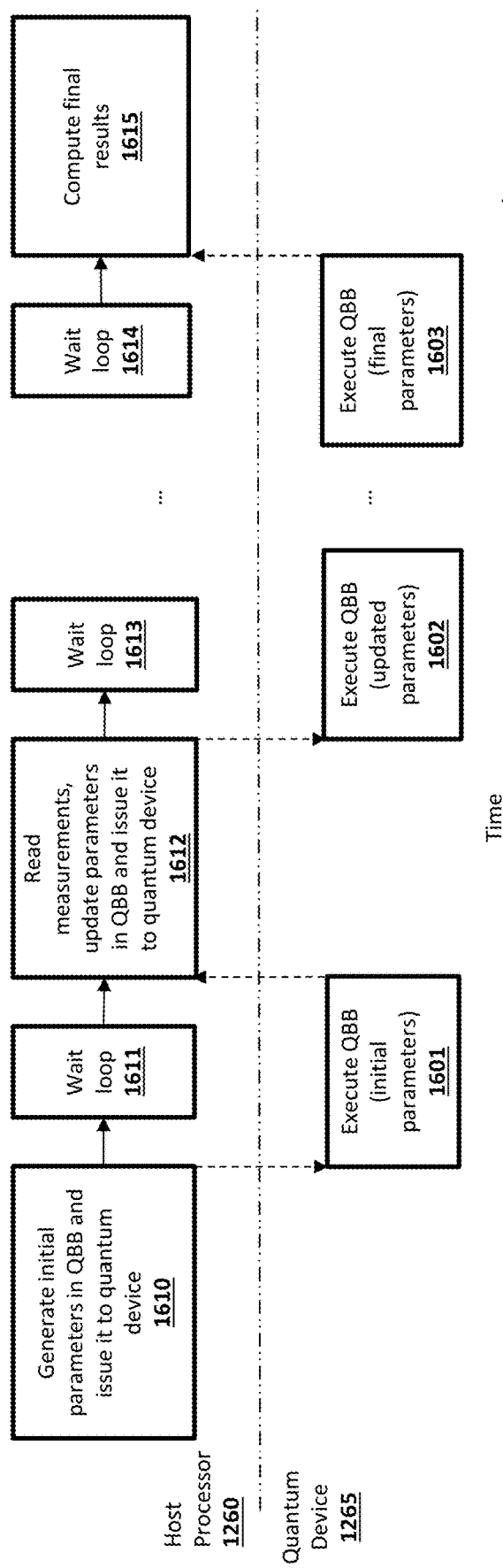
FIG. 16 illustrates timing associated with the execution of quantum basic blocks.

As mentioned above, some embodiments of the invention compile quantum kernels into quantum basic blocks (QBBs), where each QBB is a straight-line sequence of quantum operations with no classical operations. FIG. 16 illustrates an example of runtime execution control flow on the host processor 1260 and quantum acceleration hardware 1265. The program is launched by the host processor 1260 and includes a first program code sequence 1610 which generates initial parameters in a QBB 1601 which it issues it to the quantum device 1265. A wait loop 1611 is executed on the host processor 1260 during execution of the QBB 1601. In some embodiments, the wait loop waits for an event such as completion of the QBB 1601 to resume execution. A second program code sequence 1612 reads measurements and/or updates the parameters in the next QBB 1602 which it issues to the quantum device 1265. Another wait loop 1613 is executed in parallel with the second QBB 1602. The non-quantum and quantum instruction sequences alternate in this manner until a final QBB 1603 is executed with a final set of parameters in parallel with a final wait loop 1614. A final program code sequence 1615 executed on the host processor 1260 then computes the final results which may be stored in processor registers and/or the cache/memory subsystem of the host processor 1260 Once a quantum kernel is called by the program, the host processor uses a blocking call to issue the corresponding QBB 1601-1602 and transfers the control to the quantum hardware 1265. After the QBB execution is complete (e.g., after QBB 1602 completes execution in the example), the results are passed to the host program 1600, and the program control is transferred back to the host processor 1260.

Embodiments of the invention facilitate tight integration of a processor and the quantum accelerator and update instructions in the instruction stream dynamically for parameterized circuits 1425 at runtime. This design allows users to specify both quantum and classical functions in a single program file 1501 and generates a single integrated executable binary. Thus, our approach can leverage symbol mapping to update parameters used in a quantum circuit at runtime.

Figure 17:
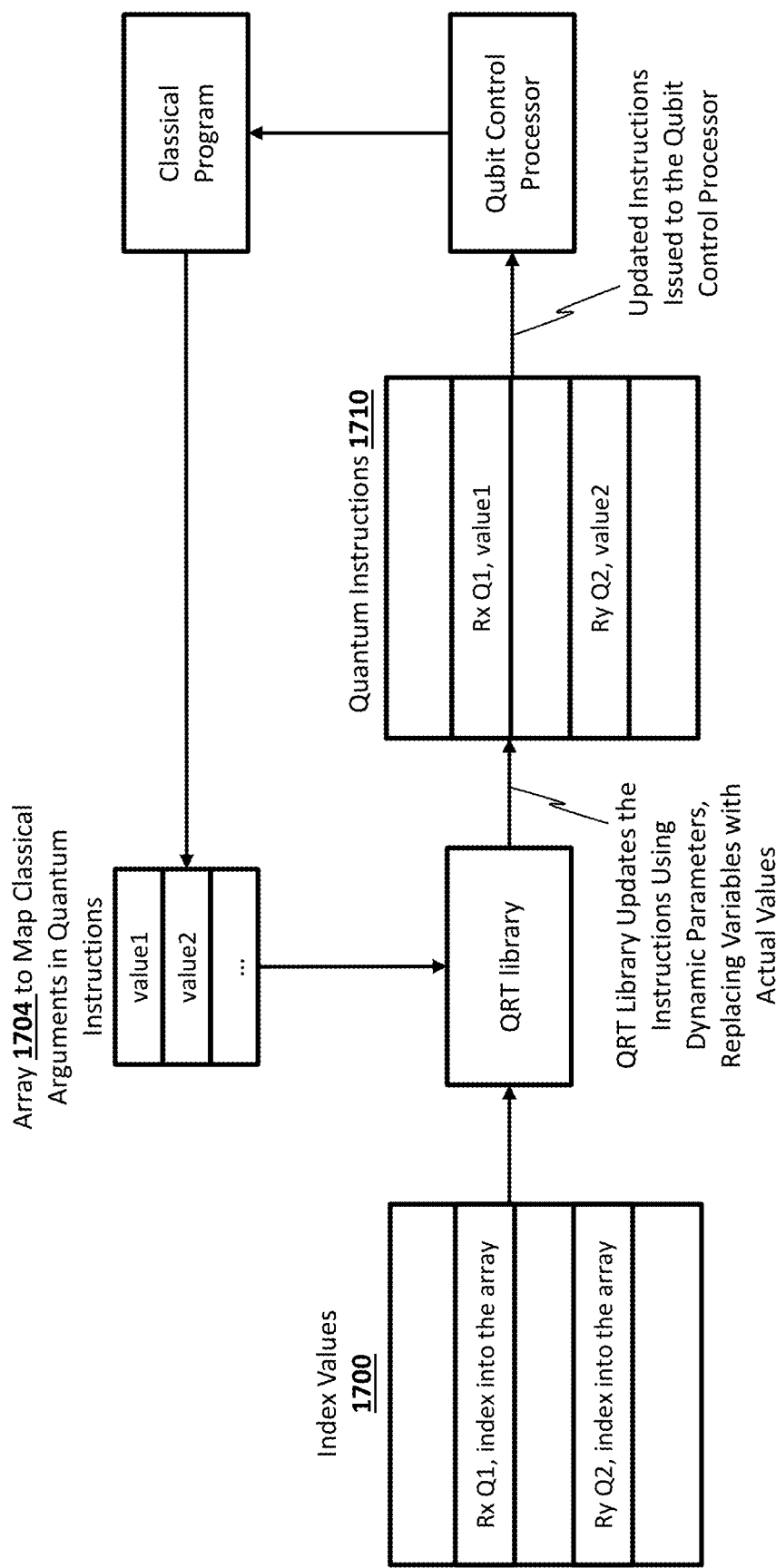
FIG. 17 illustrates an embodiment in which a host program performs dynamic parameter updates to quantum instructions.

FIG. 17 illustrates the workflow of updating quantum instructions 1701 at runtime in accordance with various embodiments of the invention. Index values 1700 are provided which identify the relevant instructions within the Quantum Runtime (QRT) library 1702. The host program 1710 dynamically updates the parameters of one or more instructions of the QRT library 1702 (at 1701), identified by the index values 1700. In one embodiment, the host program generates or uses an array 1704 which maps classical arguments to the quantum instructions. The QRT library 1702 updates the instructions using the dynamic parameters-replacing variables in the instructions with actual values. The updated quantum instructions 1710 are then issued to the qubit control processor 1450, which performs the underlying operations in accordance with the updated parameters. Thus, instead of re-compiling the whole circuit at runtime, the QRT library 1702 only replaces the variables with actual values for the parameterized instructions. Using these techniques, programmers only need one compilation to perform a variational algorithm for all iterations, leading to a significant performance benefit.

Figure 18:
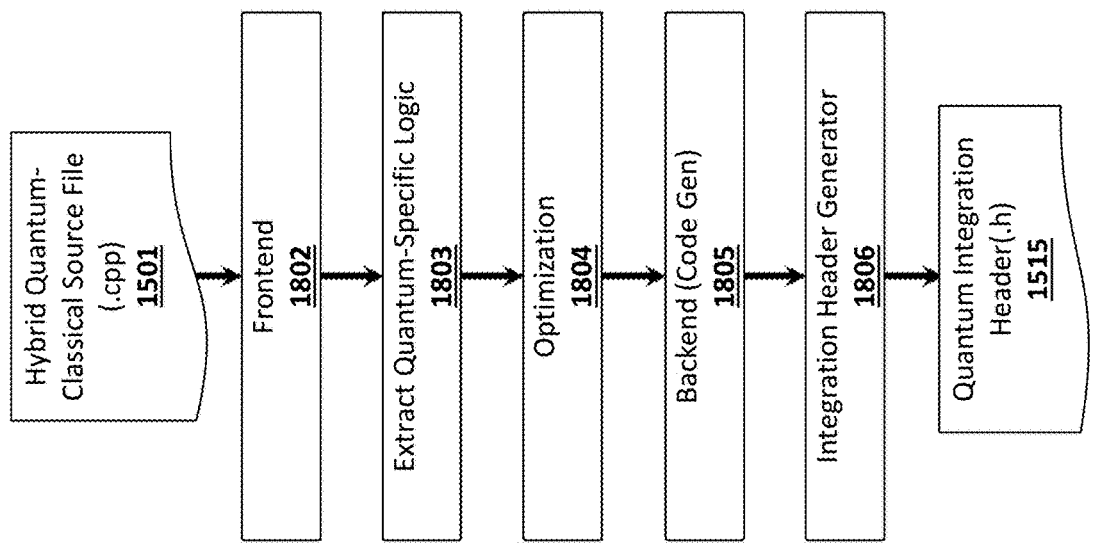
FIG. 18 illustrates a sequence of operations and components for generating a quantum integration header file.

FIG. 18 illustrates the stages in the quantum device compilation workflow broken down into multiple steps. At 1802, the frontend parses and translates a hybrid quantum-classical source file 1501 which includes both quantum and classical functions to extract quantum-specific logic 1803. One or more optimization passes are then performed 1804 to identify the most efficient order of quantum operations. The optimized code is provided to backend code generation logic 1805 which generates object code to be executed by a qubit control processor 1450 and an integration header generator 1806 generates the quantum integration header 1515. As previously described, the quantum integration header 1515 provides quantum kernel information, such as function names, symbols, function lengths, and macroinstructions for the runtime library, which is used by the host compiler 1525 to generate the binary executable 1530.

Additional details associated with certain embodiments of the invention are provided below, described with respect to LLVM and ELF extensions. Note, however, that the underlying principles of the invention are not limited to any particular programming standard or framework.

A. Frontend Extensions

Quantum_kernel and quantum_shared_var attributes are defined, as well as qbit and cbit datatypes for the language extensions. The quantum kernel attribute identifies quantum-specific functions in a program to allow intermixing of classical and quantum code in a unified source file. An array annotated with the attribute quantum_shared_var enables sharing of data from classical functions to quantum functions. The datatypes qbit and cbit are used for representing operands for qubits and classical data values, respectively.

A standard set of quantum logic gates is made available through the quintrinsics.h header file that resides under clang/Quantum directory in the LLVM structure. Although each quantum operation has an identifier name, a gate is defined by its matrix representation as indicated in the example program code sequence below. This avoids any ambiguity as to the behavior of a quantum gate, and allows for easily changing the name for a future standard. Users can also define custom operations by defining a gate with these fields. This file also defines two macros, quantum_kernel and quantum_shared_double_array, as shorthand to apply the newly-defined attributes to functions and array variables, respectively.

```
/* Pauli-X gate */
void X(qbit q) __attribute__((annotate("{ \
    \"matrix_real\" : [0, 1, 1, 0], \
    \"matrix_imag\" : [0, 0, 0, 0], \
    \"matrix_order\" : \"rm\", \
    \"is_hermitian\" : true, \
    \"is_unitary\" : true, \
    \"is_mutable\" : true, \
    \"qubit_list\" : [0], \
    \"parametric_list\" : [ ], \
    \"control_qubit_list\" : [ ], \
    \"local_basis_list\" : [1], \
    \"identifier\" : 2 \
}"))) {
    __quantum_qubit(q);
}
```

The frontend 1802 is responsible for translating the source code 1501 from a higher-level language (e.g., C++) to an intermediate representation (IR). By default, an LLVM-generated IR file has the .IL extension. At this stage, the input is a user-defined unified C++ source file 1501 with intermixed quantum-classical logic. As a result, the output is also an intermixed quantum-classical intermediate representation.

B. Transformation and Optimization Passes

Some embodiments of the invention utilize the LLVM Pass framework to define custom transformation passes that perform IR to IR translation for the quantum program (e.g., 1803 in FIG. 18). In addition to LLVM's built-in passes (such as dead code elimination, instruction combining, loop unrolling, constant folding), these embodiments include custom passes for extracting and filtering quantum functions such as Product of Pauli Rotations (PoPR) synthesis, physical qubit mapping, gate scheduling, and gate decomposition for the QuISA.

The LLVM framework provides classes and APIs to traverse and update the source in its IR form, which are utilized for optimization 1804. Certain key custom transformation passes implemented by embodiments of the invention are described below.

Extract Quantum-Specific Logic 1803: This pass takes the combined classical-quantum IR and filters it to extract quantum-only logic and its dependencies. The quantum-specific IR will be processed by the quantum device backend.

Optimization: This step includes a set of passes for efficient representation of the quantum logic by means such as PoPR synthesis.

Gate Decomposition: The standard gates are transformed into quantum operations natively supported by the quantum device as defined in QuISA.

Qubit mapping: To make optimal use of available resources, the program qubits are assigned to the available physical qubits taking qubit connectivity and availability into consideration.

Scheduling: The sequence of the quantum operations is updated considering the timing information for the target quantum device.

C. Backend Extensions

For the quantum extension, a new LLVM backend is defined that converts the IR to code for the quantum target machine. This process is also referred to as CodeGen, which stands for machine code generation. It involves directed acyclic graph (DAG) legalization, instruction selection, register allocation and machine code emission.

A custom backend target is implemented in LLVM that converts IR to machine code for the qubit control processor 1450 instruction set. A new class is defined for a quantum machine which is inherited from the TargetMachine class. In this phase, relocatable machine code is generated—referred to as a quantum object file (identified by a .qo extension). The backend can optionally generate an assembly file for a human-readable version of the machine code.

The linker is extended to add support for ELFQ and produces an executable file 1530 from the quantum object file. This binary executable 1530 puts the quantum instructions in the .qbbs text section and also creates a table header in the .qbbs section.

D. Integration Header Generator

The integration header generator 1806 constructs a quantum integration header file that is merged back into the classical part of the code. The integrated header generator 1806 also creates metadata in the form of a mapping file that maps the functions annotated with quantum kernel attributes with their identifier in the .qbbs section of the ELFQ file.

E. LibTooling

LibTooling is a library provided by Clang to support source-to-source translation tools. Embodiments of the invention leverage this facility in the LLVM framework to implement a tool called QuantumKernelReplacer. This tool instantiates a FrontendActionFactory class in Clang which invokes the specified action in the Clang frontend. Using the classes MatchFinder and ASTConsumer, this tool parses the abstract syntax tree (AST) of the input source program, looks for the invocations of functions annotated with the quantum kernel attribute, and replaces them with equivalent Quantum Runtime library API calls using the mapping from the integration header generator 1806. Thus, the quantum compute logic is represented in a different format and merged back into the classical-only portions of the code.

F. Extensible and Linkable File for Quantum (ELFQ)

Figure 19:
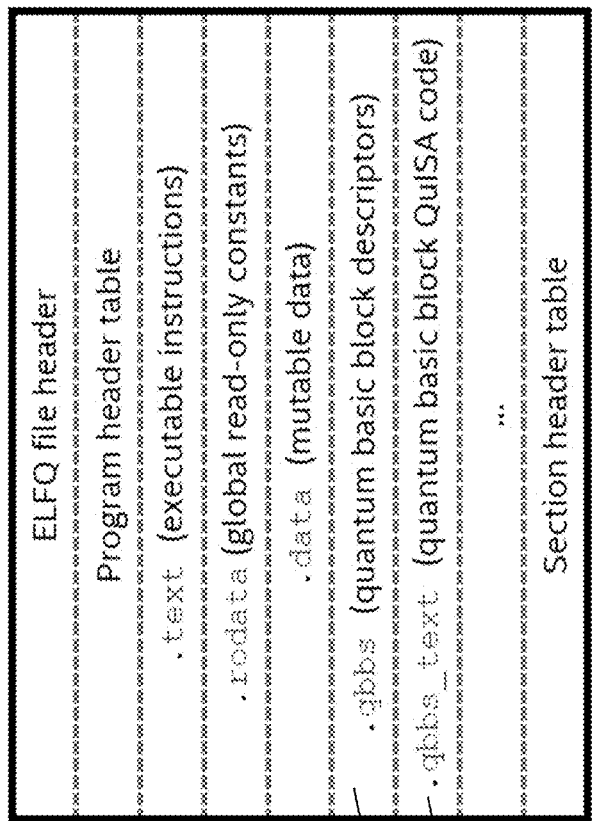
FIG. 19 illustrates quantum basic block descriptors and instructions added to an ELFQ file header.

Extensions to the industry standard Extensible and Linkable File (ELF) format are defined so that a program executable binary generated by the compiler toolchain carries with it both the classical and the quantum program code in 64-bit binary form. FIG. 19 provides a high-level view of an ELFQ file 1900 in accordance with at least some embodiments of the invention. As mentioned, quantum kernels are compiled into binary instructions and placed in the quantum basic blocks section 1902 (.qbbs text). A table header in the .qbbs section 1901 is generated that holds an identifier for each quantum kernel, its size, alignment, and offset. The arrangement, selection, and issuance of quantum basic blocks to the quantum accelerator during the standard flow of the classical program is an important component of the quantum runtime execution model and is achieved by the operating system program loader resolving the location of quantum basic block table header.

G. Quantum Runtime

Figure 20:
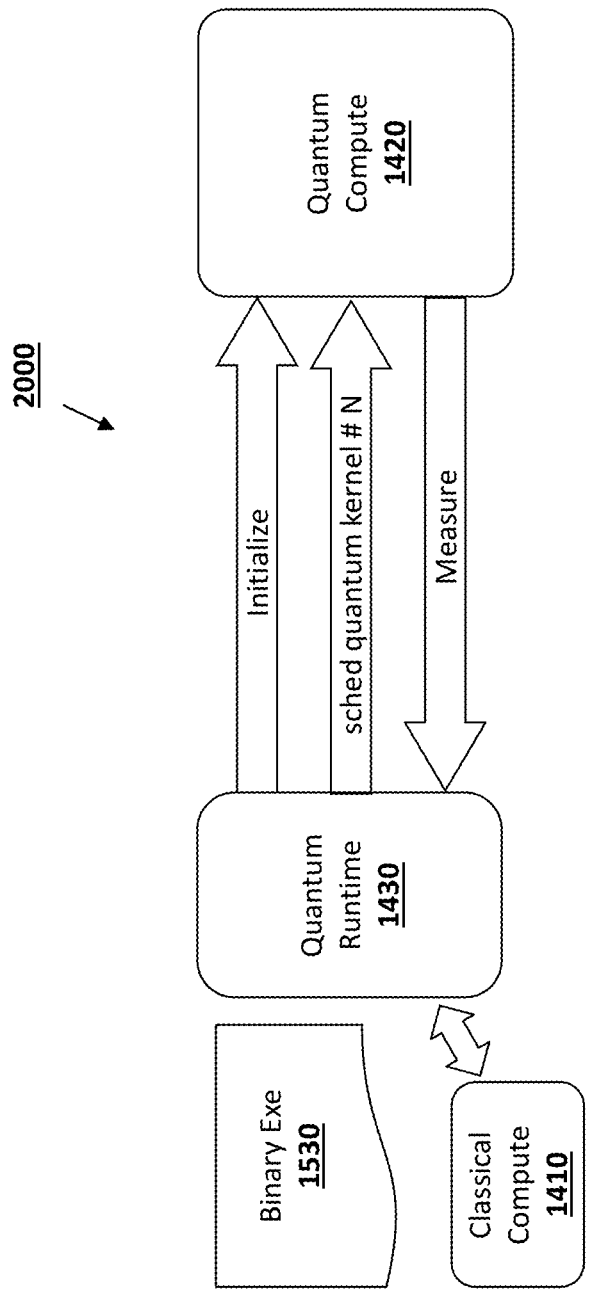
FIG. 20 illustrates a series of transactions between a quantum runtime executed on a host processor and a quantum compute unit.

The Quantum Runtime (QRT) library 1520 provides an application programming interface (API) for initialization of the underlying quantum target, scheduling of quantum functions synchronously or asynchronously to the quantum target device, and retrieval of results from quantum measurement operations. The interaction between the classical host computer 1410 and the quantum device 1420 as managed by the QRT 1430 is depicted in FIG. 20. The quantum runtime 1430 resolves parameters that are unknown at compile-time and computed at run-time. This allows execution of variational algorithms without having to recompile the application. In addition, the quantum runtime 1430 initializes and schedules quantum kernels for execution by the quantum device 1420. It also captures measurement data from the quantum device 1420 and makes the data accessible by the host computer 1410 (e.g., storing the measurement data in specified registers).

H. Sample Application Program

The following is a sample program demonstrating the usage of dynamic quantum parameters for variational algorithms in accordance with embodiments of the invention:

```
#include <clang/Quantum/quintrinsics.h>
// other includes
const int N = 3;
qbit q[N];
cbit c[N];
/* Array to hold dynamic parameters for quantum algorithm */
quantum_shared_double_array MyVariableParams[3];
quantum_kernel void prepAll( ) < for (int i = 0; i < N; i++) {
PrepZ(q[i]); }}
quantum_kernel void measAll( ) { for (int i = 0; i < N; i++) {
MeasZ(q[i], c[i]); }}
quantum_kernel void qfoo( ) {
    RX(q[0], MyVariableParams[0]);
    RY(q[1], MyVariableParams[1]);
    RZ(q[2], MyVariableParams[2]);
}
int main( ) {
    srand(time(0));
    prepAll( );
    /* Dynamically update parameters multiple times */
    for (int i = 0; i < N; i++) {
        MyVariableParams[0] = static_cast<double>(rand( )) /
        (RAND_MAX / M_PI);
        MyVariableParams[1] = std::pow(MyVariableParams[0],
        1.1);
        MyVariableParams[2] = std::sqrt(MyVariableParams[0]);
        qfoo( );
    }
    measAll( );
    for (int i = 0; i < N; i++) { std::cout << "Qubit#" << i << " : "
    << c[i] << "\n"; }
    return 0;
}
```

A new application can take advantage of the embodiments of the invention by performing the following:
1. Include the quintrinsics.h header file to use any of the pre-defined standard gates:
   {X, Y, Z, H, S, S$^\dagger$, T, T$^\dagger$, CZ, CNOT, SWAP, CCNOT, $R_X(\theta)$, $R_Y(\theta)$, $R_Z(\theta)$}
2. Define qubits as global variables—single or multiple, individual or arrays or any combination. Similarly, define classical bits for capturing measurement results. The number of available qubits depends on the target quantum device or simulator.
3. Define an array of a desired size, annotated with the attribute quantum_shared_var, to hold any dynamic parameters that will be modified during runtime.
4. All quantum operations are encapsulated in functions annotated with the quantum kernel attribute.
5. Define compute-intensive logic and classical code in conventional C++ functions.

EXAMPLE WORKLOAD

A. Overview

An example workload was executed using one particular embodiment of the invention. The example workload considered in this manuscript is the generation of thermofield double (TFD) states, a variational algorithm operated similar to QAOA. To demonstrate the capabilities of this embodiment, TFD states of size Nq={4, 6, 8, 10, 12, 14, 16, 18, 20} were generated. The results were validated using an independent optimization implementation in MATLAB for system sizes up to Nq=12.

A. Algorithm Details

The TFD generation algorithm is based on using entanglement for the purpose of modeling the degree of mixture required for the final desired thermal state. To prepare a thermal state of L qubits, a total of 2L qubits are required by the algorithm. Here, we focus on preparation of TFD states for the transverse-field Ising model (TFIM) in a one-dimensional ring described by the following Hamiltonian, $$H_{TFIM} = \sum_{i=1}^{L} Z_i Z_{i+1} + g \sum_{i=1}^{L} X_i \equiv H_{ZZ} + g H_X$$

The implementation was limited to the case of g=1 due to the existence of a critical point in the behavior of the system. The process begins by preparing pairwise bell states between corresponding qubits in the two subsystems (A and B) each containing L qubits. This realizes the infinite temperature TFD states. Then, intra-system operators corresponding to the Hamiltonian equation are applied within each of the subsystems, followed by mixing/entangling operations between the subsystems. Each of the intra-system and inter-system operations have associated variational angles that must be classically optimized for generating the desired TFD state.

Figure 21:
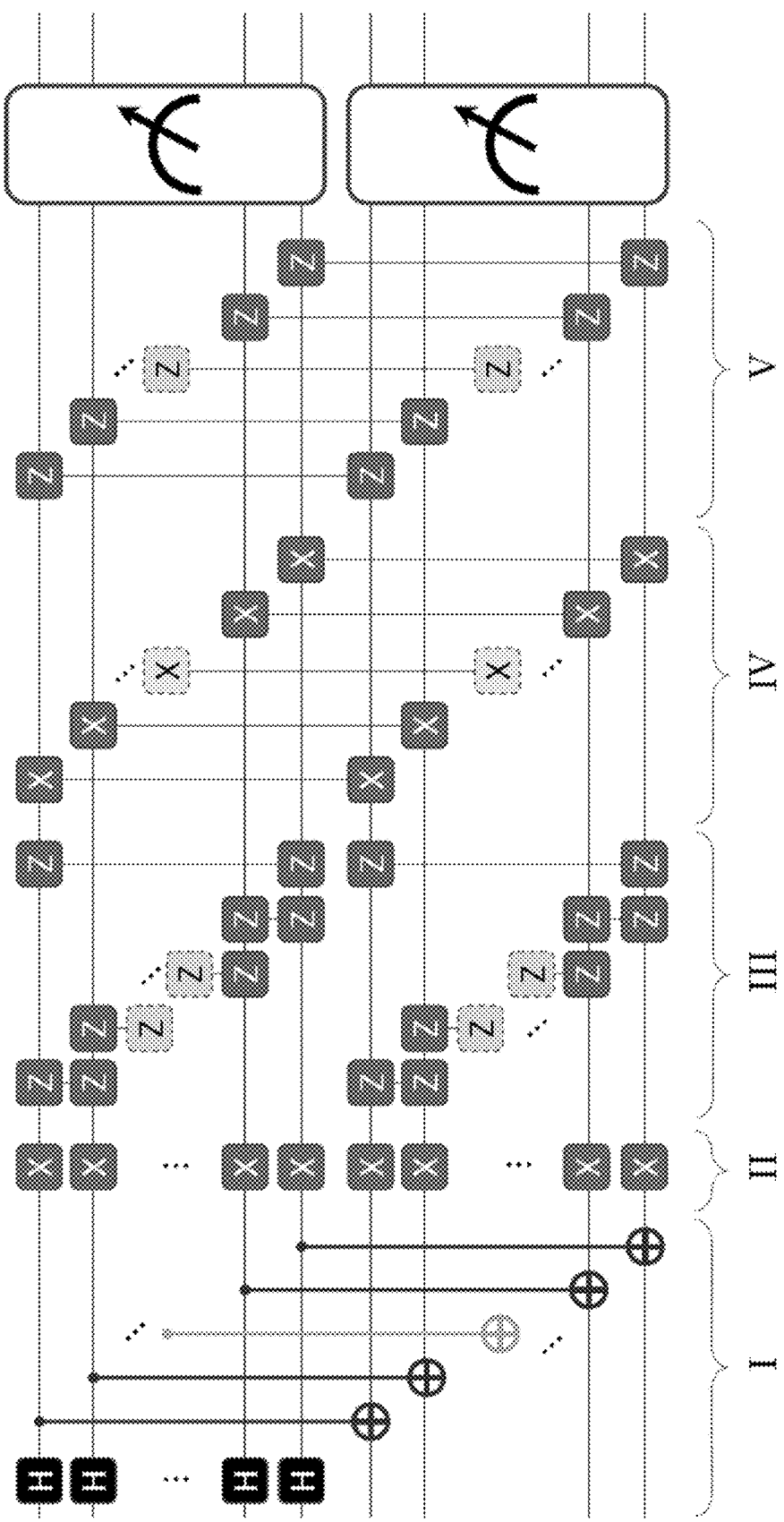
FIG. 21 illustrates a quantum gate used for testing embodiments of the invention.

The full quantum circuit for a variable number of qubits is shown in FIG. 21. The stages include: (I) preparing infinite temperature TFD state, (II) Intra-system X operation with angle $\gamma_1$, (III) Intra-system ZZ operation with angle $\gamma_2$, (IV) Inter-system XX operation with angle $\alpha_1$, (V) Inter-system ZZ operation with angle $\alpha_2$ The degree of mixture/entanglement is dependent on the desired temperature, and effectively encoded within the calculation of the cost function. The example results in this work are obtained based on single-step TFD generation (four variational angles), but for higher fidelities with higher qubit numbers it is desirable to have more steps and consequently more variational angles to be optimized. In this implementation, the four variational angles are labeled $\gamma_1$, $\gamma_2$, $\alpha_1$, $\alpha_2$. The cost function that evaluates the effectiveness of the generated states in this work is given by $$C(\beta) = \langle XA \rangle + \langle XB \rangle + \langle ZZA \rangle + \langle ZZB \rangle - \beta - 1(\langle XXAB \rangle + \langle ZZAB \rangle)$$

where the single subscript operators are acting within the corresponding subsystem and the double subscript operators represent the operators acting between the subsystems A and B. Here $\beta$ is inverse temperature, and the expectation values are evaluated with respect to the generated state.

C. Quantum Programming Considerations

Using the Intel Quantum Simulator, the final state vector may be accessed at the end of quantum system evolution. If using the resultant state vector, then only one experiment is required per iteration. However, for this demonstration the Probability Register is used which stores the probabilities for each unique basis state combination. For example, in a three-qubit system, a single circuit evaluation using IQS will give us access to the probabilities for each of the following states: 000, 001, 010, 011, 100, 101, 110, 111.

With this information available after each circuit evaluation, two runs of the same circuit are performed for each optimization iteration. In the first run, the measurements will be performed in the conventional Z-basis allowing us to calculate the Z related operators in ⟨β⟩. In the second run, Hadamard operations will be applied to all qubits prior to measurements resulting in X-basis measurements that will allow us to calculate the remaining X related expectation values in (β). The optimization is performed using the popular dlib library. This library contains several different optimization routines, and in this work we found that the find min bobyqa function performed well.

D. Results

The accuracy of TFD state generation is evaluated by calculating the fidelity of generated states with respect to the ideal thermal state at each temperature. First, the pure state on 2L qubits is reduced to a density matrix corresponding to a L qubit mixed state, by tracing over subsystem B to yield $\rho_{sim}$. Then, the thermal state accuracy is calculated to be the fidelity between the ideal ($\rho_{ideal}$) and generated density matrices ($\rho_{sim}$) as $$\mathcal{F} = [Tr\sqrt{\rho_{ideal}^{0.5} \rho_{sim} \rho_{ideal}^{0.5}}]^2$$

Figure 22:
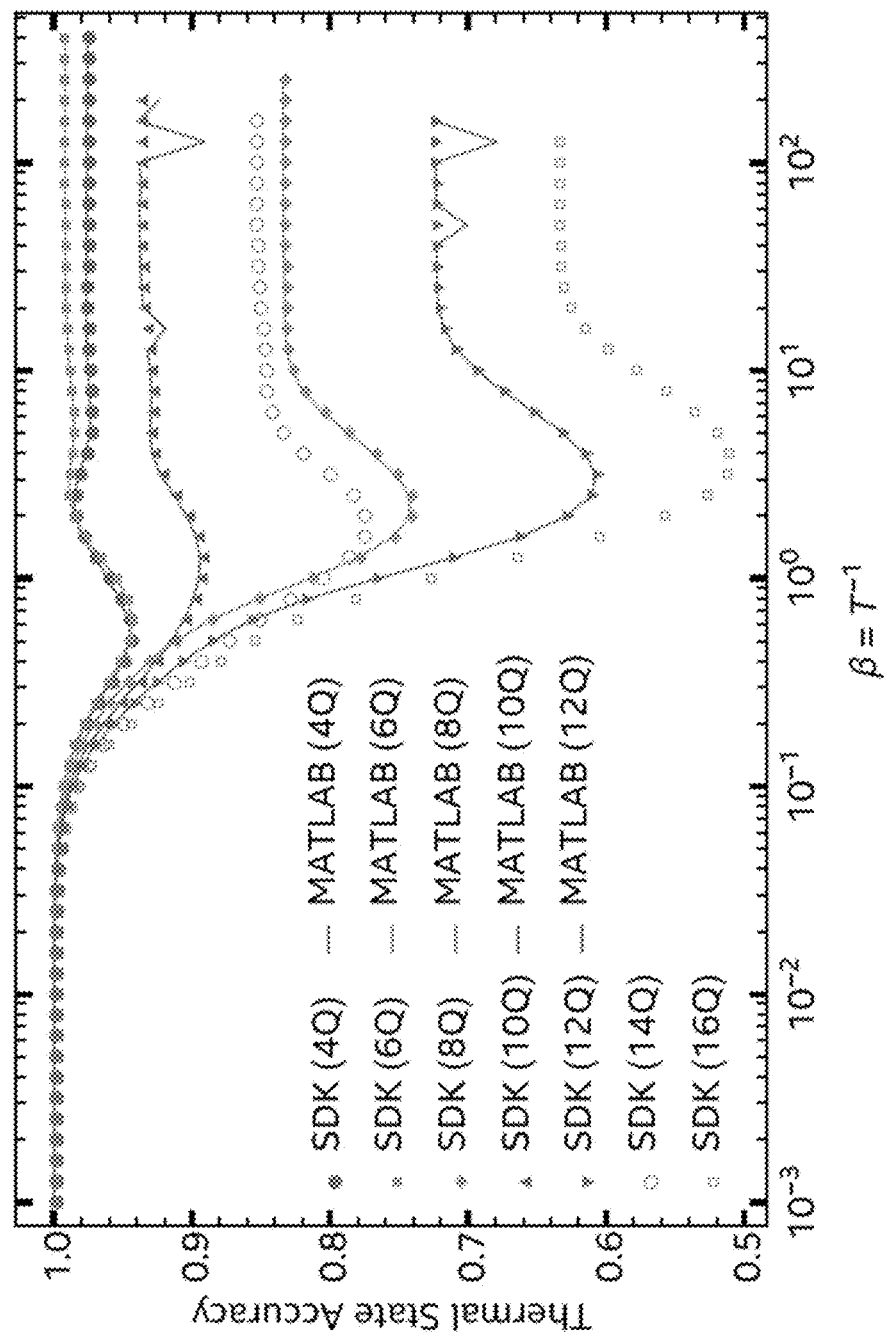
FIGS. 22-23 illustrate test results.

FIG. 22 illustrates a comparison of the thermal state accuracy for variational optimization performed with the Intel Quantum SDK and MATLAB. Excellent agreement can be observed up to Nq=12 between the optimizations when comparing the results obtained using the Intel Quantum SDK and the independent MATLAB scripts. Beyond this system size, the MATLAB implementation slowed down considerably. The trend in the lowering of fidelities for low temperatures with increasing system size continued as expected for Nq>12. The calculation of thermal state accuracy was performed using a MATLAB script, and for Nq>16 this analysis was found to be intractable with simple techniques. More sophisticated analysis and verification techniques are expected to enable analysis for larger system sizes.

Figure 23:
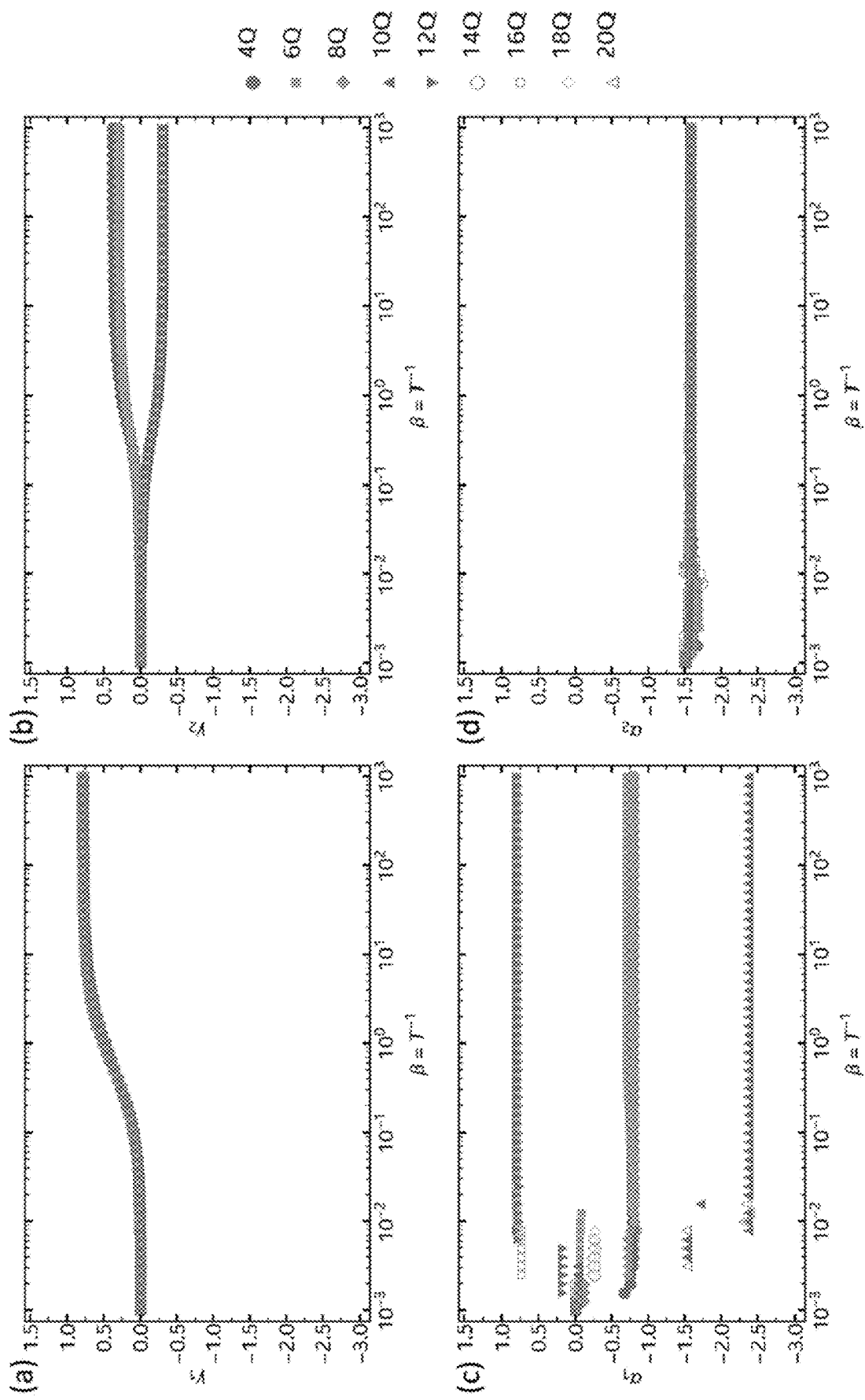

In FIG. 23 the behavior of the optimized angles $\gamma_1$, $\gamma_2$, $\alpha_1$, $\alpha_2$ is visualized with system size. The angles $\gamma_1$ and $\alpha_2$ are found to have virtually identical temperature dependence irrespective of the system size. For $\gamma_2$ and $\alpha_1$ we observe partitioning of the optimized values, but this is expected to be due to a degeneracy present in the system, and not indicative of a system size dependence. In the case of $\alpha_1$ and $\alpha_2$ a certain degree of instability is observed in the optimized angles, especially for $\beta < 10-2$, and this we attribute to the low dependence of these variational angles In summary, the results are as expected and highlight several challenges that need to be addressed when using quantum computers for realistic workloads.

A full-stack framework of compilation and execution of a quantum program is the key to harnessing the power of quantum computation. Embodiments of the invention include an LLVM-based C++ framework with quantum extensions supporting hybrid quantum-classical algorithm compilation and execution. Using these embodiments, just a single compilation is required for running quantum-classical variational algorithms, since dynamic parameters are supported.

In the above detailed description, reference is made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments. Terms like "first," "second," "third," etc. do not imply a particular ordering, unless otherwise specified.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous.

EXAMPLES

The following are example implementations of different embodiments of the invention.

Example 1. A machine-readable medium having program code stored thereon which, when executed by a machine, cause the machine to perform operations comprising: reading source code specifying both non-quantum operations to be performed by a host processor and quantum operations to be performed by a quantum accelerator; and compiling the source code to generate one or more target object files, wherein portions of the source code specifying the quantum operations are to be compiled into quantum basic blocks, each quantum basic block comprising one or more quantum instructions to be executed by the quantum accelerator, and wherein portions of the source code specifying the non-quantum operations are compiled into native processor instructions executable by the host processor.

Example 2. The machine-readable medium of example 1 wherein compiling the source code further comprises: evaluating the quantum operations specified in the source code; and grouping the corresponding quantum instructions into the quantum basic blocks based on the evaluation of the quantum operations.

Example 3. The machine-readable medium of example 2 wherein grouping the corresponding quantum instructions further comprises: terminating a first quantum basic block in response to detecting a quantum measurement operation; and starting a second quantum basic block directly following the quantum measurement operation.

Example 4. The machine-readable medium of example 2 wherein compiling the source code further comprises: sequentially bounding one or more of the quantum basic blocks which do not include a quantum measurement with portions of the native processor instructions.

Example 5. The machine-readable medium of example 1 further comprising program code to cause the machine to perform the operations of: for each quantum basic block, injecting into the one or more target object files a call to a quantum runtime module, each call associated with one of the quantum basic blocks.

Example 6. The machine-readable medium of example 5 further comprising program code to cause the machine to perform the operations of: assembling the quantum basic blocks and the native processor instructions from the one or more target object files into a unified executable file.

Example 7. The machine-readable medium of example 6 wherein the executable file is an Executable and Linker Format for Quantum (ELFQ) file.

Example 8. The machine-readable medium of example 1 wherein the quantum operations are arranged in one or more quantum kernels, and wherein compiling further comprises: extracting the quantum kernels from the source code; generating an integration header file to store quantum kernel information; and using the quantum kernel information when generating the one or more target object files.

Example 9. The machine-readable medium of example 8 wherein the operations of extracting the quantum kernels and generating the integration header is performed by a first compiler or compiler component and wherein the quantum kernel information is used by a second compiler or compiler component.

Example 10. A method comprising: reading source code specifying both non-quantum operations to be performed by a host processor and quantum operations to be performed by a quantum accelerator; and compiling the source code to generate one or more target object files, wherein portions of the source code specifying the quantum operations are to be compiled into quantum basic blocks, each quantum basic block comprising one or more quantum instructions to be executed by the quantum accelerator, and wherein portions of the source code specifying the non-quantum operations are compiled into native processor instructions executable by the host processor.

Example 11. The method of claim 10 wherein compiling the source code further comprises: evaluating the quantum operations specified in the source code; and grouping the corresponding quantum instructions into the quantum basic blocks based on the evaluation of the quantum operations.

Example 12. The method of example 11 wherein grouping the corresponding quantum instructions further comprises: terminating a first quantum basic block in response to detecting a quantum measurement operation; and starting a second quantum basic block directly following the quantum measurement operation.

Example 13. The method of example 11 wherein compiling the source code further comprises: sequentially bounding one or more of the quantum basic blocks which do not include a quantum measurement with portions of the native processor instructions.

Example 14. The method of example 10 further comprising: for each quantum basic block, injecting into the one or more target object files a call to a quantum runtime module, each call associated with one of the quantum basic blocks.

Example 15. The method of example 14 further comprising: assembling the quantum basic blocks and the native processor instructions from the one or more target object files into a unified executable file.

Example 16. The method of claim 15 wherein the executable file is an Executable and Linker Format for Quantum (ELFQ) file.

Example 17. The method of example 10 wherein the quantum operations are arranged in one or more quantum kernels, and wherein compiling further comprises: extracting the quantum kernels from the source code; generating an integration header file to store quantum kernel information; and using the quantum kernel information when generating the one or more target object files.

Example 18. The method of example 17 wherein the operations of extracting the quantum kernels and generating the integration header is performed by a first compiler or compiler component and wherein the quantum kernel information is used by a second compiler or compiler component.

Example 19. A system comprising: a host processor; a quantum accelerator coupled to the host processor; a memory to store source code specifying both non-quantum operations to be performed by the host processor and quantum operations to be performed by a quantum accelerator; and the host processor execute program code to: compile portions of the source code specifying the quantum operations into quantum basic blocks, each quantum basic block comprising one or more quantum instructions to be executed by the quantum accelerator, and compile portions of the source code specifying the non-quantum operations into native processor instructions executable by the host processor.

Example 20. The system of example 19 wherein compiling the source code further comprises: evaluating the quantum operations specified in the source code; and grouping the corresponding quantum instructions into the quantum basic blocks based on the evaluation of the quantum operations.

Example 21. The system of example 20 wherein grouping the corresponding quantum instructions further comprises: terminating a first quantum basic block in response to detecting a quantum measurement operation; and starting a second quantum basic block directly following the quantum measurement operation.

Example 22. The system of example 20 wherein compiling the source code further comprises: sequentially bounding one or more of the quantum basic blocks which do not include a quantum measurement with portions of the native processor instructions.

Example 23. The system of example 19 further comprising: for each quantum basic block, injecting into the one or more target object files a call to a quantum runtime module, each call associated with one of the quantum basic blocks.

Example 24. The system of example 22 further comprising: assembling the quantum basic blocks and the native processor instructions from the one or more target object files into a unified executable file.

Example 25. The system of example 24 wherein the executable file is an Executable and Linker Format for Quantum (ELFQ) file.

Example 26. The system of example 19 wherein the quantum operations are arranged in one or more quantum kernels, and wherein compiling further comprises: extracting the quantum kernels from the source code; generating an integration header file to store quantum kernel information; and using the quantum kernel information when generating the one or more target object files.

Example 27. The system of example 26 wherein the operations of extracting the quantum kernels and generating the integration header is performed by a first compiler or compiler component executed by the host processor and wherein the quantum kernel information is used by a second compiler or compiler component executed by the host processor.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A machine-readable medium having program code stored thereon which, when executed by a machine, cause the machine to perform operations comprising:
    reading source code specifying both non-quantum operations to be performed by a host processor and quantum operations to be performed by a quantum accelerator; and
    compiling the source code to generate one or more target object files,
    wherein portions of the source code specifying the quantum operations are to be compiled into quantum basic blocks, each quantum basic block comprising one or more quantum instructions to be executed by the quantum accelerator, and
    wherein portions of the source code specifying the non-quantum operations are compiled into native processor instructions executable by the host processor.

2. The machine-readable medium of claim 1 wherein compiling the source code further comprises:
    evaluating the quantum operations specified in the source code; and
    grouping the corresponding quantum instructions into the quantum basic blocks based on the evaluation of the quantum operations.

3. The machine-readable medium of claim 2 wherein grouping the corresponding quantum instructions further comprises:
    terminating a first quantum basic block in response to detecting a quantum measurement operation; and
    starting a second quantum basic block directly following the quantum measurement operation.

4. The machine-readable medium of claim 2 wherein compiling the source code further comprises:
    sequentially bounding one or more of the quantum basic blocks which do not include a quantum measurement with portions of the native processor instructions.

5. The machine-readable medium of claim 1 further comprising program code to cause the machine to perform the operations of:
    for each quantum basic block, injecting into the one or more target object files a call to a quantum runtime module, each call associated with one of the quantum basic blocks.

6. The machine-readable medium of claim 5 further comprising program code to cause the machine to perform the operations of:
    assembling the quantum basic blocks and the native processor instructions from the one or more target object files into a unified executable file.

7. The machine-readable medium of claim 6 wherein the executable file is an Executable and Linker Format for Quantum (ELFQ) file.

8. The machine-readable medium of claim 1 wherein the quantum operations are arranged in one or more quantum kernels, and wherein compiling further comprises:
    extracting the quantum kernels from the source code;
    generating an integration header file to store quantum kernel information; and
    using the quantum kernel information when generating the one or more target object files.

9. The machine-readable medium of claim 8 wherein the operations of extracting the quantum kernels and generating the integration header is performed by a first compiler or compiler component and wherein the quantum kernel information is used by a second compiler or compiler component.

10. A method comprising:
    reading source code specifying both non-quantum operations to be performed by a host processor and quantum operations to be performed by a quantum accelerator; and
    compiling the source code to generate one or more target object files,
    wherein portions of the source code specifying the quantum operations are to be compiled into quantum basic blocks, each quantum basic block comprising one or more quantum instructions to be executed by the quantum accelerator, and
    wherein portions of the source code specifying the non-quantum operations are compiled into native processor instructions executable by the host processor.

11. The method of claim 10 wherein compiling the source code further comprises:
    evaluating the quantum operations specified in the source code; and
    grouping the corresponding quantum instructions into the quantum basic blocks based on the evaluation of the quantum operations.

12. The method of claim 11 wherein grouping the corresponding quantum instructions further comprises:
   terminating a first quantum basic block in response to detecting a quantum measurement operation; and
   starting a second quantum basic block directly following the quantum measurement operation.

13. The method of claim 11 wherein compiling the source code further comprises:
   sequentially bounding one or more of the quantum basic blocks which do not include a quantum measurement with portions of the native processor instructions.

14. The method of claim 10 further comprising:
   for each quantum basic block, injecting into the one or more target object files a call to a quantum runtime module, each call associated with one of the quantum basic blocks.

15. The method of claim 14 further comprising:
   assembling the quantum basic blocks and the native processor instructions from the one or more target object files into a unified executable file.

16. The method of claim 15 wherein the executable file is an Executable and Linker Format for Quantum (ELFQ) file.

17. The method of claim 10 wherein the quantum operations are arranged in one or more quantum kernels, and wherein compiling further comprises:
   extracting the quantum kernels from the source code;
   generating an integration header file to store quantum kernel information; and
   using the quantum kernel information when generating the one or more target object files.

18. The method of claim 17 wherein the operations of extracting the quantum kernels and generating the integration header is performed by a first compiler or compiler component and wherein the quantum kernel information is used by a second compiler or compiler component.

19. A system comprising:
   a host processor;
   a quantum accelerator coupled to the host processor;
   a memory to store source code specifying both non-quantum operations to be performed by the host processor and quantum operations to be performed by a quantum accelerator; and
   the host processor execute program code to:
      compile portions of the source code specifying the quantum operations into quantum basic blocks, each quantum basic block comprising one or more quantum instructions to be executed by the quantum accelerator, and
      compile portions of the source code specifying the non-quantum operations into native processor instructions executable by the host processor.

20. The system of claim 19 wherein compiling the source code further comprises:
   evaluating the quantum operations specified in the source code; and
   grouping the corresponding quantum instructions into the quantum basic blocks based on the evaluation of the quantum operations.

21. The system of claim 20 wherein grouping the corresponding quantum instructions further comprises:
   terminating a first quantum basic block in response to detecting a quantum measurement operation; and
   starting a second quantum basic block directly following the quantum measurement operation.

22. The system of claim 20 wherein compiling the source code further comprises:
   sequentially bounding one or more of the quantum basic blocks which do not include a quantum measurement with portions of the native processor instructions.

23. The system of claim 19 further comprising:
   for each quantum basic block, injecting into the one or more target object files a call to a quantum runtime module, each call associated with one of the quantum basic blocks.

24. The system of claim 22 further comprising:
   assembling the quantum basic blocks and the native processor instructions from the one or more target object files into a unified executable file.

25. The system of claim 24 wherein the executable file is an Executable and Linker Format for Quantum (ELFQ) file.

26. The system of claim 19 wherein the quantum operations are arranged in one or more quantum kernels, and wherein compiling further comprises:
   extracting the quantum kernels from the source code;
   generating an integration header file to store quantum kernel information; and
   using the quantum kernel information when generating the one or more target object files.

27. The system of claim 26 wherein the operations of extracting the quantum kernels and generating the integration header is performed by a first compiler or compiler component executed by the host processor and wherein the quantum kernel information is used by a second compiler or compiler component executed by the host processor.

* * * * *